(12) United States Patent
Kagawa

(10) Patent No.: US 8,165,473 B2
(45) Date of Patent: Apr. 24, 2012

(54) OPTICAL-TIME-DIVISION-MULTIPLEXING DIFFERENTIAL PHASE SHIFT KEYING SIGNAL GENERATING APPARATUS

(75) Inventor: Masatoshi Kagawa, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 467 days.

(21) Appl. No.: 12/458,562

(22) Filed: Jul. 16, 2009

(65) Prior Publication Data

US 2010/0021175 A1 Jan. 28, 2010

(30) Foreign Application Priority Data

Jul. 25, 2008 (JP) .................................. 2008-192190
Jun. 22, 2009 (JP) .................................. 2009-147404

(51) Int. Cl.
*H04B 10/04* (2006.01)
*H04B 10/12* (2006.01)

(52) U.S. Cl. ........................................ 398/183; 398/188

(58) Field of Classification Search .......... 398/182–201, 398/31, 98, 101, 102
See application file for complete search history.

(56) References Cited

U.S. PATENT DOCUMENTS

| | | | |
|---|---|---|---|
| 7,130,545 B2 * | 10/2006 | Lou et al. ........................ | 398/198 |
| 7,817,923 B2 * | 10/2010 | Akiyama et al. ................ | 398/188 |
| 2003/0223462 A1 * | 12/2003 | Fu et al. ........................... | 370/500 |
| 2006/0263098 A1 * | 11/2006 | Akiyama et al. ................ | 398/188 |

FOREIGN PATENT DOCUMENTS

| | | |
|---|---|---|
| JP | 2005-006175 A | 1/2005 |
| JP | 2007-189616 A | 7/2007 |
| JP | 2008-085889 A | 4/2008 |

OTHER PUBLICATIONS

R. Ludwig et al, "160 Gbit/s DPSK-Transmission—Technologies and System Impact," Proc. 30th European Conference on Optical Communication (ECOC 2004), Tul. 1, 3.

* cited by examiner

*Primary Examiner* — Kenneth N Vanderpuye
*Assistant Examiner* — Abbas H Alagheband
(74) *Attorney, Agent, or Firm* — Rabin & Berdo, P.C.

(57) ABSTRACT

An apparatus detecting an optical carrier phase difference between adjacent optical pulses structuring an OTDM-DPSK signal, by generally-used optical and electrical elements, is provided. An OTDM-DPSK signal generating section has an optical splitter, a first phase modulator, a second phase modulator, an optical coupler, and a monitor signal branching device, and generates and outputs an OTDM-DPSK signal and a monitor signal. An optical carrier phase difference detecting section has an optical carrier interferometer, and an interference signal detecting section including a optical-to-electrical converter and a peak detection circuit. The monitor signal is inputted to the optical carrier interferometer, and an interference monitor signal is outputted. The interference monitor signal is inputted to the optical-to-electrical converter, and an electrical interference monitor signal is outputted. The electrical interference monitor signal is inputted to the peak detection circuit, and an optical carrier phase difference detection signal is generated and outputted.

3 Claims, 9 Drawing Sheets

OPTICAL-TIME-DIVISION-MULTIPLEXING DIFFERENTIAL PHASE SHIFT KEYING SIGNAL GENERATING APPARATUS

CROSS-REFERENCE TO RELATED APPLICATION

This application claims priority under 35 USC 119 from Japanese Patent Application No. 2008-192190 and Japanese Patent Application No. 2009-147404, the disclosure of which is incorporated by reference herein.

BACKGROUND OF THE INVENTION

1. Field of the Invention

The present invention relates to an optical pulse signal generating apparatus optical-time-division-multiplexing (OTDM) an optical pulse signal that is coded by a differential phase shift keying (DPSK) system, so as to generate an optical-time-division-multiplexing differential phase shift keying signal (OTDM-DPSK signal), and outputs the OTDM-DPSK signal. In particular, the present invention relates to optical carrier phase difference detection between adjacent optical pulses of an OTDM-DPSK signal.

2. Description of the Related Art

In recent years, in the technical field of optical communication, the balanced detection system has been studied in addition to the intensity modulation-direct detection (IM-DD) system (refer to, for example, R. Ludwig et al., "160 Gbit/s DPSK-Transmission—Technologies and System Impact", Proc. 30$^{th}$ European Conference on Optical Communication (ECOC 2004), Tu1. 1, 3: document 1).

The IM-DD system is a system that carries out detection by detecting the envelope of intensity of the optical carrier of a received signal by using a photodiode. The IM-DD system is a representative example of optical communication by an optical pulse signal that is coded by the ASK (Amplitude Shift Keying) system. Intensity modulation is generally referred to as ASK or OOK (On Off Keying). Note that, intensity modulation is referred to as "ASK" in the following description.

The balanced detection system is a system that carries out detection by detecting an electrical signal having an amplitude that is twice the magnitude as in the IM-DD system, by using a balanced detector. The balanced detection system is a representative example of optical communication by an optical pulse signal that is coded in the DPSK format.

In the IM-DD system, receiving and transmitting are possible by a simple device, and the IM-DD system can also be applied to an intensity reproducing device in which an optical amplifier is built-in. Due thereto, the IM-DD system is widely used. On the other hand, in the DPSK system, modulation of an optical pulse train is carried out by the two variables of 0 and $\pi$, and a transmission signal is generated and transmitted. At the receiving end, the received signal is divided in two into first and second received signals, and a time delay of the time period that one optical pulse (one bit) occupies on the time axis is provided to the first received signal. Then, the receiving end combines the first received signal, to which the time delay has been provided, and the second received signal, and carries out balanced detection on the received signal obtained by combining these signals. Hereinafter, 1/n of the time period that one optical pulse occupies on the time axis, where n is a positive integer, is called the "time corresponding to 1/n bit". Further, the transmission signal (optical pulse signal) that is generated by carrying out modulation of the optical pulse train by the two variables of 0 and $\pi$ is called the "transmission signal coded in the DPSK format" or the "optical pulse signal coded in the DPSK format".

The optical pulses and the phase of the optical pulses will be described here. An optical pulse that is observed as a change in optical intensity is expressed by the envelope of the waveform of the square of the amplitude of the electrical field vector of the optical carrier. Accordingly, in the following description, "time waveform of the optical pulses" refers to the time waveform of the envelope of the square of the amplitude of the electrical field vector of the optical pulses.

The phase of the optical carrier of the optical pulses means the relative phases of the peak of the optical carrier with respect to the peak of the envelope of the electrical field vector of the optical pulses. The phase of the optical carrier of the optical pulses is called the "optical carrier phase" or the "absolute phase". Further, the optical carrier phases or the absolute phases are more strictly called the "carrier-envelope phases" (often abbreviated as CEP). Hereinafter, the phases of the optical carrier of the optical pulses is called the "optical carrier phases". The envelope of the electrical field vector of one optical pulse includes a very large number of peaks of the optical carrier.

For example, in a case in which the wavelength of the optical carrier is 1.5 μm, when converted into frequency, it becomes about $2 \times 10^{14}$ Hz. On the other hand, when the repetition frequency of the optical pulses is 40 GHz, it is around $4 \times 10$ Hz. Accordingly, in this case, 5000 ($= (2 \times 10^{14})/(4 \times 10^{10}) = 5 \times 10^{3}$) peaks of the optical carrier are included in the envelope of the electrical field vector of one optical pulse, i.e., one optical pulse in the time waveform.

The aforementioned "modulating of optical pulses by the two variables of 0 and $\pi$" means leaving the phase of the electrical field vector of the optical carrier that forms the optical pulse (the phase of the optical carrier) as is or shifting it by $\pi$ phase, with respect to the envelope of the optical carrier. Namely, "modulating of optical pulses by the two variables of 0 and $\pi$" means leaving the optical carrier phase as is or shifting it by $\pi$ phase with respect to the envelope of the electrical field vector of the optical pulse.

In a case of using the balanced detection system applied to the DPSK system, the receiver sensitivity is improved by greater than or equal to 3 dB, as compared with the IM-DD system applied to the ASK system (refer to document 1 for example).

In the OTDM communication system of the DPSK system disclosed in document 1, a 40 Gbit/s DPSK signal is generated, and this DPSK signal is divided into four. Next, other than the signal of the first optical path (the signal of one channel), time delays corresponding to ¼, 2/4, ¾ bits are provided to the respective signals of the three optical paths that are the second through fourth optical paths (signals of three channels). Further, the signals of the first through fourth optical paths, including the signal of the first optical path to which a time delay was not provided, are multiplexed. In this way, an OTDM signal is generated. Namely, among the signals of the four optical paths, the signal of the first optical path is the actual signal. However, among the signals of the four optical paths, the signals of the remaining three optical paths that are the second through fourth optical paths are copy signals of the signal of the first optical path. A practical generating apparatus must use respectively different signals for the signals of the first through the fourth optical paths respectively. Accordingly, in the case where the OTDM communication system of the DPSK system disclosed in document 1 is used as is, an apparatus that generates practical OTDM-DPSK signals cannot be practically realized.

As an apparatus OTD-multiplexing a practical, multiple-channel optical pulse signal that is coded in the DPSK format, and generates an optical-time-division-multiplexing differential phase shift keying signal (hereinafter called an OTDM-DPSK signal generating apparatus), an example that is structured on the basis of the system disclosed in document 1 will be explained with reference to FIG. 1. FIG. 1 is a schematic block structural diagram of an OTDM-DPSK signal generating apparatus.

An OTDM-DPSK signal generating apparatus 10 is configured to include: an optical splitter 12; a first phase modulator 14; a second phase modulator 16; a ½-bit delay device 18; and an optical coupler 20. Transmission signals are supplied to the OTDM-DPSK signal generating apparatus 10 from a first modulator driver 22 and a second modulator driver 24.

An optical pulse train 11, at which optical pulses are lined-up at uniform intervals on the time axis, is inputted to the OTDM-DPSK signal generating apparatus 10. The optical pulse train 11 is divided in two at the optical splitter 12 and generated as first optical pulse train 13-1 and second optical pulse train 13-2. The first optical pulse train 13-1 and the second optical pulse train 13-2 are respectively inputted to the first phase modulator 14 and the second phase modulator 16.

At the first phase modulator 14 and the second phase modulator 16, the first optical pulse train 13-1 and the second optical pulse train 13-2 are respectively coded in the DPSK format by transmission signals 23 and 25 that are supplied from the first modulator driver 22 and the second modulator driver 24. The coded first optical pulse train 13-1 and the second optical pulse train 13-2 are generated as a first differential phase shift keying signal 15 and a second differential phase shift keying signal 17, and are outputted respectively.

The second differential phase shift keying signal 17 is inputted to the ½-bit delay device 18. A time delay corresponding to ½ bit is provided to the inputted second differential phase shift keying signal 17, and it is generated as a delayed second differential phase shift keying signal 19 and outputted. The first differential phase shift keying signal 15 and the delayed second differential phase shift keying signal 19 are multiplexed at the optical coupler 20, and generated as an OTDM-DPSK signal 21 and outputted. Namely, on the basis of the optical pulse train 11, the OTDM-DPSK signal generating apparatus 10 converts the transmission signals of the two channels, that are supplied from the first modulator driver 22 and the second modulator driver 24, into DPSK signals. Then, the OTDM-DPSK signal generating apparatus 10 OTD-multiplexes these DPSK signals of the two channels, and outputs the OTDM-DPSK signal.

FIG. 1 shows an example of realizing OTDM of two channels. The situation is the same as in FIG. 1 no matter how many channels there are, provided that the number of channels is a number given by $2^N$ (where N is an integer of greater than or equal than 1). For example, in the case of realizing OTDM of four channels, it suffices to provide time delays corresponding to 0, ¼, 2/4, ¾ bits respectively to the optical pulse signals of the first through fourth channels that are coded in the DPSK format, and to multiplex the signals.

In order for the OTDM-DPSK signal generating apparatus 10 to operate, it is necessary for the first optical pulse train 13-1 and the second optical pulse train 13-2 that are branched by the optical splitter 12 to not receive phase modulation other than the phase modulation provided by the first phase modulator 14, the second phase modulator 16 and the ½-bit delay device 18 respectively. Namely, at the optical coupler 20, the optical carrier phase difference between the optical pulses that structure the first differential phase shift keying signal 15 and the optical carrier phase difference between the optical pulses that structure the delayed second differential phase shift keying signal 19 must not take-on values other than 0 or $\pi$.

However, at the optical paths that the first optical pulse train 13-1 and the second optical pulse train 13-2 propagate through, and the optical paths that the first differential phase shift keying signal 15 and the second differential phase shift keying signal 17 propagate through, and the optical path that the delayed second differential phase shift keying signal 19 propagates through, fluctuations in the optical path length arise due to variations in temperature and the like. When comparing the magnitude of the fluctuations in the optical path length and 0 or $\pi$ as converted into optical carrier phases, it is very difficult technically to keep the magnitude of the fluctuations in the optical path length to an extent such that they can be ignored; Accordingly, there is the need to, by some method, detect and control the optical carrier phase difference between adjacent optical pulses that structure an optical pulse signal.

There are known methods of detecting and controlling the optical carrier phase difference (see, for example, Japanese Patent Applications Laid-Open (JP-A) Nos. 2005-006175 and 2007-189616). The method of detecting the optical carrier phase difference disclosed in JP-A No. 2005-006175 branches-off a portion of an optical phase signal that is coded by the ASK system. Then, this method leads the branched-off optical pulse signal to an interferometer, and observes the intensity of the interference light outputted from the interferometer. The intensity value of the interference light is used as a control signal. The method of detecting the optical carrier phase difference disclosed in JP-A No. 2007-189616 leads, to an interferometer, an ASK time division multiplex signal that is generated by time division multiplexing an optical pulse signal coded by the ASK system, and converts the signal outputted from the interferometer into an electrical signal. This method observes the optical carrier phase difference by an electrical circuit observing the time average value of the electrical signal. This time average value is detected as the optical carrier phase difference, and is used as a control signal.

Other than the above-described methods of optical carrier phase difference detection with respect to an ASK time division multiplex signal obtained by time division multiplexing an optical pulse signal coded by the ASK system, there are also known optical carrier phase difference detection methods with respect to an OTDM-DPSK signal that is generated by an optical pulse signal, that is coded in the DPSK format, being optical-time-division-multiplexed (refer to JP-A No. 2008-085889). Interference signal light, that has been intensity-modulated in accordance with the optical carrier phase difference between the optical pulses by an optical interferometer that is specially devised and to which OTDM-DPSK signals are inputted, is converted into an electrical signal, and the time average value of the electrical signal is observed by an electrical circuit. This time average value is detected as the optical carrier phase difference and is utilized as a control signal.

With regard to phase fluctuations of the optical carrier phase difference between adjacent optical pulses that are detected by optical carrier phase difference detection, here, an optical pulse signal of the carrier-suppressed-RZ (CS-RZ) format will be described as an example. A CS-RZ format optical pulse signal is an optical pulse signal generated by coding, by the ASK system, an optical pulse train in which adjacent optical pulses are lined-up with the optical carrier phases thereof having a phase difference of π (hereinafter called "CS optical pulse train" upon occasion).

In order to split a portion of an OTDM format optical pulse signal and detect the optical carrier phase difference, the optical pulse signal is introduced into an optical carrier phase difference detecting apparatus. A CS-RZ format optical pulse signal inputted to the optical carrier phase difference detecting apparatus is divided in two, a delay of one bit is provided to one, and the both are again made to interfere. When an interference signal is outputted from the optical carrier phase difference detecting apparatus in this way, the optical carrier difference between adjacent optical pulses does not take-on a value other than π. In the case of an ideal optical pulse signal in the CS-RZ format, the intensity of the output light is 0.

The CS-RZ format is generated from the optical pulses whose phases are inverted at 0, π at each one bit. Therefore, if an optical pulse train is divided in two and a one-bit delay is provided to one and they are made to interfere, adjacent optical pulses whose optical carrier phase difference is π interfere with one another.

On the other hand, in a case in which the optical carrier pulse difference between adjacent optical pulses of a CS-RZ format optical pulse signal takes-on a value other than 0 or π, an interference signal whose optical intensity is a value greater than 0 is outputted from the optical carrier phase difference detecting apparatus. Namely, in a case in which the optical carrier phase difference between the adjacent optical pulses is offset from 0 or π by φ (0≦φ≦π), the intensity of the outputted interference signal becomes greater as the value of φ approaches 0, and becomes the maximum intensity when φ=0. Accordingly, the value of φ can be known by monitoring the time average value of the intensity of the interference signal outputted from the optical carrier phase difference detecting apparatus. Further, in a case in which feedback control is carried out so that the time average value of the intensity of the outputted interference signal always becomes the minimum, an ideal CS-RZ format optical pulse signal, in which the optical carrier phase difference between adjacent optical pulses does not take-on a value other than π, can be generated. Hereinafter, φ is called the "magnitude of the phase fluctuation".

However, the above-described optical carrier phase difference detecting methods that use optical pulse signals in the CS-RZ format cannot use OTDM-DPSK signals that are outputted from the OTDM-DPSK signal generating apparatus described with reference to FIG. 1. The reasons therefore will be described with reference to (1), (2) and (3) of FIG. 2. (1) of FIG. 2 shows the time waveform of an OTDM-DPSK signal 21 at the OTDM-DPSK signal generating apparatus shown in FIG. 1. (2) of FIG. 2 shows the time waveform of a signal which is achieved by splitting the OTDM-DPSK signal 21 within the interferometer for detecting the optical carrier phase difference disclosed in JP-A No. 2005-006175, and applying a delay of 1 bit. Further, (3) of FIG. 2 shows the time waveform of a signal which is re-coupled within the interferometer and outputted therefrom. The time waveforms shown in (1), (2) and (3) of FIG. 2 show, among the envelopes of the amplitude waveforms of the electrical field vectors of the optical carriers, the envelopes at the sides that take-on positive values, and the envelopes at the sides that take-on negative values are deleted. Further, the time axis is shown at an arbitrary scale in the horizontal axis direction, and the magnitude of the amplitude is shown at an arbitrary scale in the vertical axis direction.

The optical carrier phases of the optical pulses respectively structuring the first OTDM-DPSK signal 21 shown in (1) of FIG. 2 and the delayed second OTDM-DPSK signal shown in (2), interfere at phase differences of 0 and φ, π and φ, 0 and (π+φ), and π and (π+φ). If the first OTDM-DPSK signal 21 is generated as an ideal OTDM-DPSK signal, the magnitude of the phase fluctuation is 0, i.e., φ=0. However, as described above, fluctuations in the optical path lengths arise at the optical paths through which the optical signals propagate. Therefore, the magnitude of the phase fluctuation cannot always maintain the state φ=0 unless some type of control is carried out.

At the first phase modulator 14 and the second phase modulator 16, modulation of 0 or π as the optical carrier phase is carried out on the optical pulses. Namely, either modulation that does not change the optical carrier phase is carried out (modulation of 0 is carried out), or modulation that shifts the optical carrier phase by π is carried out (modulation of π is carried out) on the optical pulses.

As a result of the modulation at the first phase modulator 14 and the second phase modulator 16, either phase modulation in which the optical carrier phase is maintained as is (shown as 0 in (1) and (2) of FIG. 2) or phase modulation in which the optical carrier phase is shifted by π (shown by π in (1) and (2) of FIG. 2) is applied to the first OTDM-DPSK signal 21. There exist optical pulses to which a phase fluctuation of φ (shown by φ in (1) and (2) of FIG. 2), that is due to fluctuations in the optical path lengths and the like, is applied to each of the optical carrier phases of the optical pulses structuring the first OTDM-DPSK signal 21, in addition to this phase modulation.

The time waveform of an interferometer output signal that is generated as a result of combining the first OTDM-DPSK signal 21 shown in (1) of FIG. 2 and the delayed second OTDM-DPSK signal shown in (2), is the shape shown in (3). The reasons for this are as follows.

In (1), (2) and (3) of FIG. 2, the time widths of each one optical pulse are illustrated as being sectioned by the vertical broken lines. Attention is focused first onto the leftmost optical pulse in each of (1), (2) and (3) of FIG. 2. Among the optical pulses that structure the first differential phase shift keying signal 15 shown in (1) of FIG. 2, the optical carrier phase of the leftmost optical pulse is 0. Among the optical pulses that structure the delayed second differential phase shift keying signal 19 shown in (2), the optical carrier phase of the leftmost optical pulse is φ. In this case, the optical pulse that is generated as a result of interference of the both optical pulses has an amplitude of a finite magnitude (hereinafter called "amplitude of the first magnitude") that is different than 0, as is the case with the leftmost optical pulse of an interferometer output signal shown in (3).

Similarly, at the second from the left, the optical pulse whose optical carrier phase is φ and the optical pulse whose optical carrier phase is π interfere. Therefore, an optical pulse having an amplitude (hereinafter called "amplitude of the second magnitude") of a magnitude that is different than the aforementioned amplitude of the first magnitude is generated.

Looking in the same way as described above at the magnitudes of the amplitudes of the optical pulses shown in (1), (2) and (3) of FIG. 2 in order from the leftmost side, the following can be concluded. Namely, an optical pulse having the amplitude of the first magnitude is generated in cases in which the optical carrier phases of the optical pulses of the first OTDM-DPSK signal 21 and the delayed second OTDM-DPSK signal are the combination of 0 and φ, and the combination of π and (π+φ). Further, an optical pulse having the amplitude of the second magnitude is generated in cases in which the optical carrier phases of the optical pulses of the first OTDM-DPSK signal 21 and the delayed second OTDM-DPSK signal are the combination of φ and π, and the combination of 0 and (π+φ).

Accordingly, the optical pulses structuring the interferometer output signal are two types that have the first and the second magnitudes. The magnitudes of the amplitudes of the two types of optical pulses of the interferometer output signal are functions of φ that is caused by fluctuations in the optical path lengths and the like. Accordingly, if φ is near 0, the magnitude of the first amplitude is greater than the magnitude of the second amplitude. Further, if φ is near π, the magnitude of the second amplitude is greater than the magnitude of the first amplitude. (3) of FIG. 2 shows a case in which the magnitude of the first amplitude is greater than the magnitude of the second amplitude, i.e., a case in which φ is near 0.

When the value of φ changes in the range from 0 to π in this way, the magnitude of the first amplitude and the magnitude of the second amplitude vary on account of the relationship that, when one decreases, the other increases. Accordingly, the average intensity of the interferometer output signal does not fluctuate. Therefore, in the above-described optical carrier phase difference detecting methods, a phase difference φ between adjacent optical pulses of the OTDM-DPSK signal cannot be detected.

Further, in accordance with the apparatus for detecting the optical carrier phase difference between adjacent optical pulses of an OTDM-DPSK signal that is disclosed in JP-A No. 2008-085889, the magnitude φ of the above-described phase fluctuation can be detected. However, this apparatus requires an exclusive-use optical interferometer, and a combined optical coupler/splitter, and the like.

SUMMARY OF THE INVENTION

Thus, the present invention provides an OTDM-DPSK signal generating apparatus that is equipped with a section detecting the optical carrier phase difference between adjacent optical pulses, and that can be structured by generally-used optical elements and electronic elements, and that can detect the optical carrier phase difference between adjacent optical pulses structuring an OTDM-DPSK signal.

A first aspect of the present invention is an optical-time-division-multiplexing differential phase shift keying signal generating apparatus including: an optical-time-division-multiplexing differential phase shift keying signal generating section including: an optical splitter dividing an optical pulse train in two into a first optical pulse train and a second optical pulse train; a first phase modulator generating, from the first optical pulse train that is inputted thereto, a differential phase shift keying signal of a first channel that is coded by a differential phase shift keying system, and outputting the differential phase shift keying signal of the first channel; a second phase modulator generating, from the second optical pulse train that is inputted thereto; a differential phase shift keying signal of a second channel that is coded by the differential phase shift keying system, and outputting the differential phase shift keying signal of the second channel; an optical coupler that optical-time-division-multiplexes the differential phase shift keying signal of the first channel and the differential phase shift keying signal of the second channel, and generates and outputs a 2:1 multiplex optical-time-division-multiplexing differential phase shift keying signal; and a monitor signal branching device branching off and taking out a monitor signal from the 2:1 multiplex optical-time-division-multiplexing differential phase shift keying signal, an optical carrier phase difference detecting section, including: an optical carrier phase interferometer that divides the monitor signal that is inputted into first and second divisional monitor signals, and provides a time delay corresponding to one bit of the monitor signal to the second divisional monitor signal, and generates and outputs an interference monitor signal that is obtained by combining a generated delayed second divisional monitor signal and the first divisional monitor signal and causing them to interfere; and an interference signal detecting section extracting an alternating current component of the interference monitor signal from the interference monitor signal that is inputted, and generating and outputting an optical carrier phase difference detection signal that is a voltage signal proportional to a time average intensity of the alternating current component.

In a second aspect of the present invention, in the above-described first aspect, the interference signal detecting section may include: a optical-to-electrical converter that photoelectrically converts the interference monitor signal, and generates and outputs an electrical interference monitor signal; and a peak detection section generating and outputting an optical carrier phase difference detection signal that is a voltage signal proportional to a time average intensity of an alternating current component of the electrical interference monitor signal.

In a third aspect of the present invention, in the above-described second aspect, the peak detection section may include: an electrical branching device that branches the electrical interference monitor signal into a first electrical interference monitor signal and a second electrical interference monitor signal, and outputs the first electrical interference monitor signal and the second electrical interference monitor signal; a first high frequency detector generating a first high frequency detection signal from the first electrical interference monitor signal, and outputting the first high frequency detection signal; a first low-pass filter generating a first low frequency signal from the first high frequency detection signal, and outputting the first low frequency signal; a second high frequency detector generating a second high frequency detection signal from the second electrical interference monitor signal, and outputting the second high frequency detection signal; a second low-pass filter generating a second low frequency signal from the second high frequency detection signal, and outputting the second low frequency signal; and a direct current differential amplifier generating the optical carrier phase difference detection signal from both the first low frequency signal and the second low frequency signal, and outputting the optical carrier phase difference detection signal.

BRIEF DESCRIPTION OF THE DRAWINGS

Exemplary embodiments of the present invention will be described in detail based on the following figures, wherein.

DETAILED DESCRIPTION OF THE INVENTION

Figure 1:
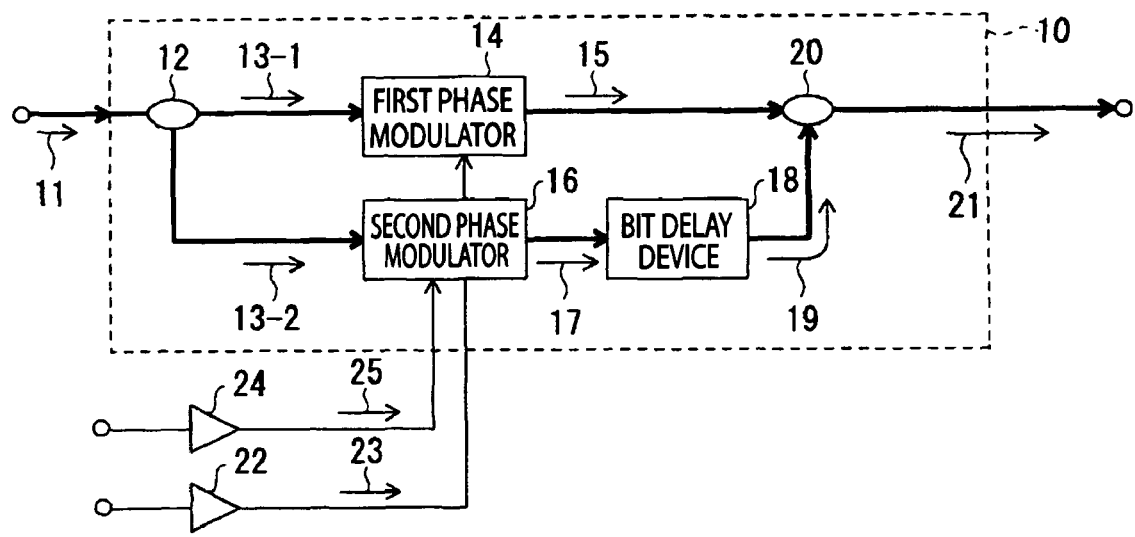
FIG. 1 is a schematic block structural diagram of the basic structure of an OTDM-DPSK signal generating apparatus.
Figure 2:
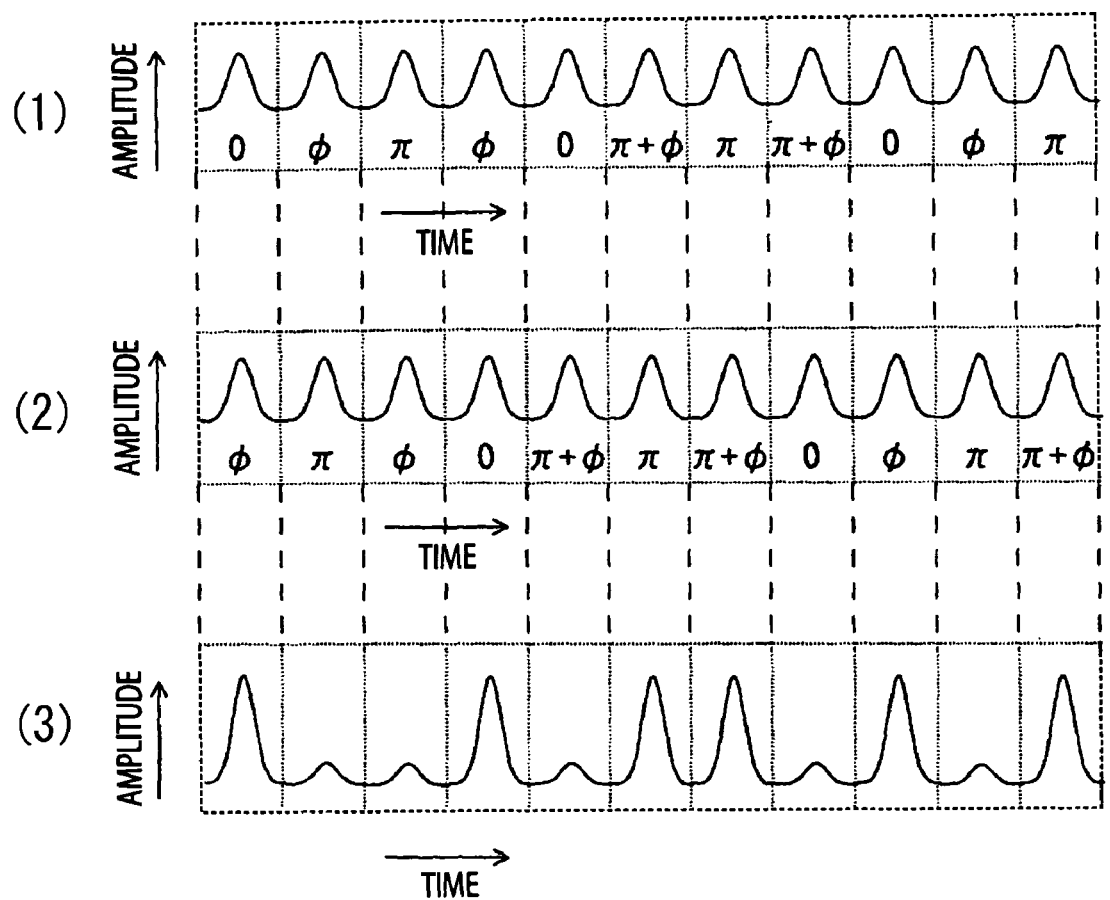
FIG. 2 is a drawing showing time waveforms in the OTDM-DPSK signal generating apparatus.

The present inventors arrived at the idea that it is possible to structure a means, that branches an OTDM-DPSK signal and takes-out a monitor signal and, from this monitor signal, generates an optical carrier phase difference detection signal that is provided as a function of the optical carrier phase difference between the adjacent optical pulses structuring the monitor signal, without using an optical interferometer of special specifications and by using a Mach-Zehnder interferometer that is a widely-used optical interferometer.

In accordance with the gist of the present invention that is based on the above-described idea, the following OTDM-DPSK signal generating apparatus is provided.

The OTDM-DPSK signal generating apparatus of the present invention includes with an OTDM-DPSK signal generating section and an optical carrier phase difference detecting section.

The OTDM-DPSK signal generating section has an optical splitter, a first phase modulator, a second phase modulator, an optical coupler, and a monitor signal branching device.

The optical splitter divides an optical pulse train in two into a first optical pulse train and a second optical pulse train. From the inputted first optical pulse train, the first phase modulator generates a differential phase shift keying signal of a first channel that is coded in the DPSK format, and outputs the signal. From the inputted second optical pulse train, the second phase modulator generates a differential phase shift keying signal of a second channel that is coded in the DPSK format, and outputs the signal. The optical coupler optical-time-division-multiplexes the differential phase shift keying signal of the first channel and the differential phase shift keying signal of the second channel, and generates a 2:1 multiplex OTDM-DPSK signal and outputs the signal. The monitor signal branching device branches-off and takes-out a monitor signal from the 2:1 multiplex OTDM-DPSK signal.

The optical carrier phase difference detecting section has an optical carrier interferometer and an interference signal detecting section.

The optical carrier interferometer divides an inputted monitor signal into first and second divisional monitor signals, and provides a time delay corresponding to one bit of the monitor signal to the second divisional monitor signal. Then, the optical carrier interferometer combines the delayed second divisional monitor signal, that was generated by the time delay having been provided, and the first divisional monitor signal and causes them to interfere, and generates an interference monitor signal and outputs the signal. The interference signal detecting section generates an optical carrier phase difference detection signal that is a voltage signal proportional to the time average intensity of the alternating current component of the interference monitor signal that is extracted from the inputted interference monitor signal, and outputs the optical carrier phase difference detection signal.

The interference signal detecting section suitably is structured to include a optical-to-electrical converter (O/E converter) and a peak detection circuit. The O/E converter photoelectrically converts the interference monitor signal, and generates and outputs an electrical interference monitor signal. The peak detection circuit generates and outputs an optical carrier phase difference detection signal that is a voltage signal proportional to the time average intensity of the alternating current component of the electrical interference monitor signal.

The peak detection circuit is suitably structured to include an electrical branching device, a first high frequency detector, a first low-pass filter, a second high frequency detector, a second low-pass filter and a direct current differential amplifier.

The electrical branching device branches the electrical interference monitor signal into a first electrical interference monitor signal and a second electrical interference monitor signal, and outputs the signals. The first high frequency detector generates a first high frequency detection signal from the first electrical interference monitor signal, and outputs the generated signal. The first low-pass filter generates a first low frequency signal from the first high frequency detection signal, and outputs the generated signal. The second high frequency detector generates a second high frequency detection signal from the second electrical interference monitor signal, and outputs the generated signal. The second low-pass filter generates a second low frequency signal from the second high frequency detection signal, and outputs the generated signal. The direct current differential amplifier generates an optical carrier phase difference detection signal from both the first low frequency signal and the second low frequency signal, and outputs the generated signal.

A portion of the 2:1 multiplex OTDM-DPSK signal, that is outputted from the OTDM-DPSK signal generating section of the OTDM-DPSK signal generating apparatus of the present invention, is branched-off as a monitor signal by the monitor signal branching device. This monitor signal is inputted to the optical carrier interferometer that is provided at the optical carrier phase difference detecting section, and an interference monitor signal is generated and outputted.

The respective optical pulses that structure the interference monitor signal are generated as a result of the adjacent optical pulses of the monitor signal interfering at the optical carrier interferometer.

In cases in which the value of phase fluctuation φ is 0 or π as will be described later, the adjacent optical pulses of the monitor signal strengthen one another or disappear. As a result, the peak intensity of the optical pulses that structure the interference monitor signal becomes 4 times larger, or becomes 0. Namely, because the optical pulses of the monitor signal have a time waveform that is a similar shape as the 2:1 multiplex OTDM-DPSK signal, the adjacent optical pulses of the optical pulses that structure of the monitor signal strengthen one another or disappear. This means that the adjacent optical pulses of the optical pulses that structure the 2:1 multiplex OTDM-DPSK signal strengthen one another or disappear at the optical carrier interferometer.

On the other hand, in cases in which the value of the phase fluctuation φ is π/2, the optical pulses that structure the interference monitor signal are all equal. Accordingly, the peak intensity of the optical pulses is 2 times the peak intensity of the optical pulses structuring the monitor signal. Further, in cases in which the value of the phase fluctuation φ is between 0 and π/2, or is between π/2 and π, among the optical pulses that structure the interference monitor signal, optical pulses whose peak intensity is large and optical pulses whose peak intensity is small exist in the same proportion.

Accordingly, if the peak intensity of the optical pulses that structure the interference monitor signal can be known, the value of the phase fluctuation φ of the 2:1 multiplex OTDM-DPSK signal can be known.

The peak intensity of the optical pulses that structure the interference monitor signal is measured by the interference signal detecting section. The peak intensity of the optical pulses that structure the interference monitor signal is proportional to the time average intensity of the alternating current component of the interference monitor signal. Namely, at the interference signal detecting section, an optical carrier phase difference detection signal (that is a voltage signal that is proportional to the time average intensity of the alternating current component of the interference monitor signal) is generated and outputted. Accordingly, the optical carrier phase difference between the adjacent optical pulses that structure the OTDM-DPSK signal can be detected by the optical carrier phase difference detecting section.

The optical carrier interferometer provided at the optical carrier phase difference detecting section divides the inputted monitor signal into first and second divisional monitor signals, and provides a time delay corresponding to one bit of the monitor signal to the second divisional monitor signal. Next, the optical carrier interferometer combines the delayed second divisional monitor signal, that is generated by the time delay having been provided, and the first divisional monitor signal and makes them interfere, and has the function of generating and outputting an interference monitor signal. Accordingly, a widely-used Mach-Zehnder interferometer can be utilized as the optical carrier interferometer.

The interference signal detecting section is structured to include the O/E converter and the peak detection circuit. As will be described later, it is thereby possible to generate and output an optical carrier phase difference detection signal that is a voltage signal that is proportional to the time average intensity of the alternating current component of the interference monitor signal.

The peak detection circuit is structured to include the electrical branching device, the first high frequency detector, the first low-pass filter, the second high frequency detector, the second low-pass filter, and the direct current differential amplifier. As will be described later, it is thereby possible to generate and output an optical carrier phase difference detection signal from the electrical interference monitor signal that is outputted from the O/E converter.

As described above, widely-used electronic elements, that are the O/E converter, the electrical branching device, the high frequency detectors, the low-pass filters and the direct current differential amplifier, are appropriately used as the structural elements that structure the interference signal detecting section.

Accordingly, in accordance with the OTDM-DPSK signal generating apparatus of the present invention, a 2:1 multiplex optical-time-division-multiplexing differential phase shift keying signal is generated and outputted from an optical-time-division-multiplexing differential phase shift keying signal generating section. Together therewith, an optical carrier phase difference detection signal, by which the value of the phase fluctuation $\phi$ of the 2:1 multiplex OTDM-DPSK signal can be known, is generated and outputted from the optical carrier phase difference detecting section. Moreover, the OTDM-DPSK signal generating apparatus of the present invention can be structured by appropriately using widely-used optical elements, such as a Mach-Zehnder interferometer and the like, and widely-used electronic elements. Accordingly, the OTDM-DPSK signal generating apparatus of the present invention does not require any optical elements of special specifications or electronic elements of special specifications.

Hereinafter, exemplary embodiments of the present invention will be described with reference to FIG. 3 through FIG. 8.

Figure 3:
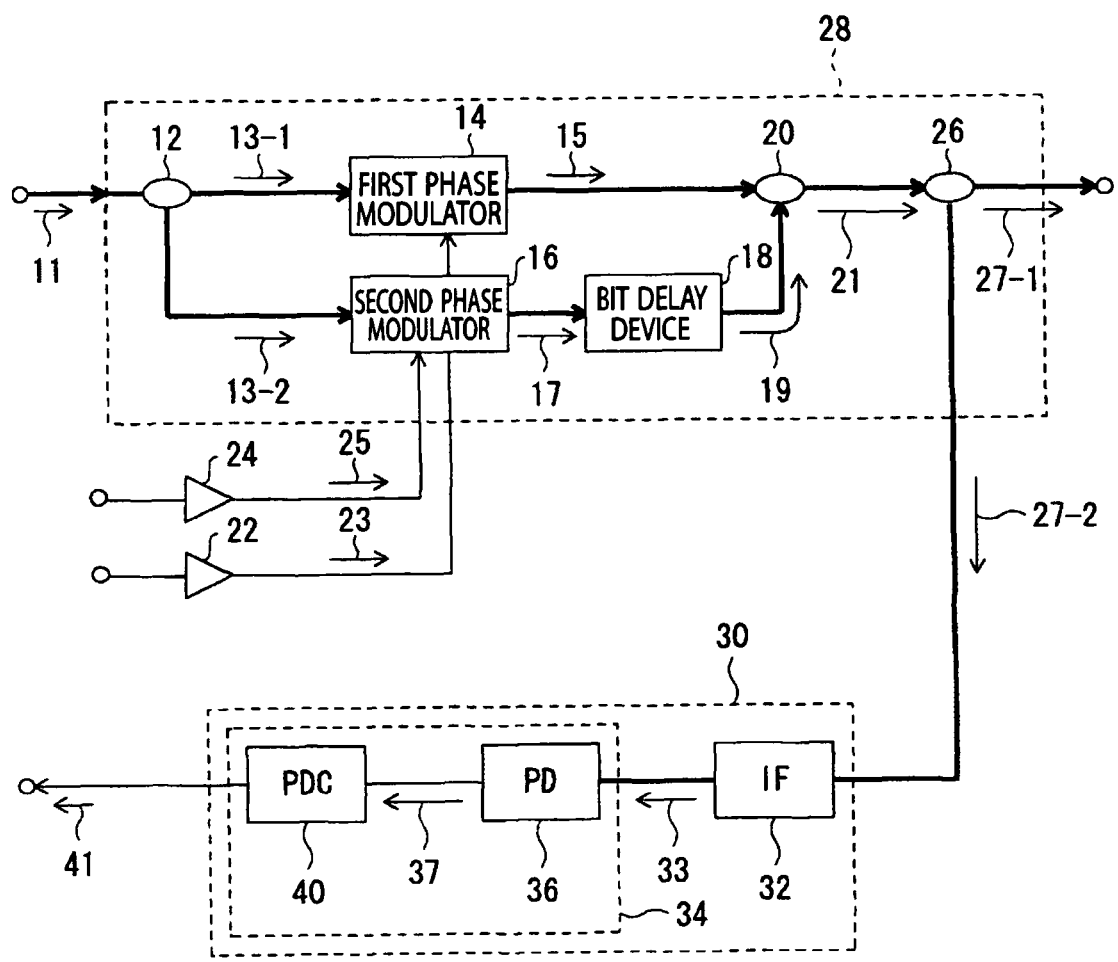
FIG. 3 is a schematic block structural diagram of an OTDM-DPSK signal generating apparatus of an exemplary embodiment of the present invention.
Figure 4:
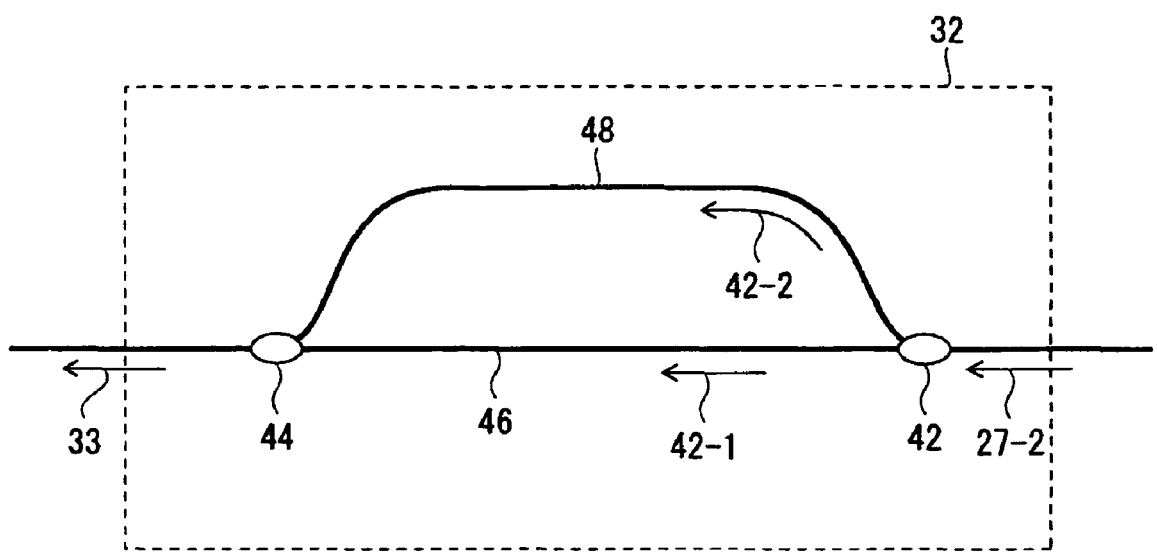
FIG. 4 is a schematic block structural diagram of an optical carrier interferometer.
Figure 5:
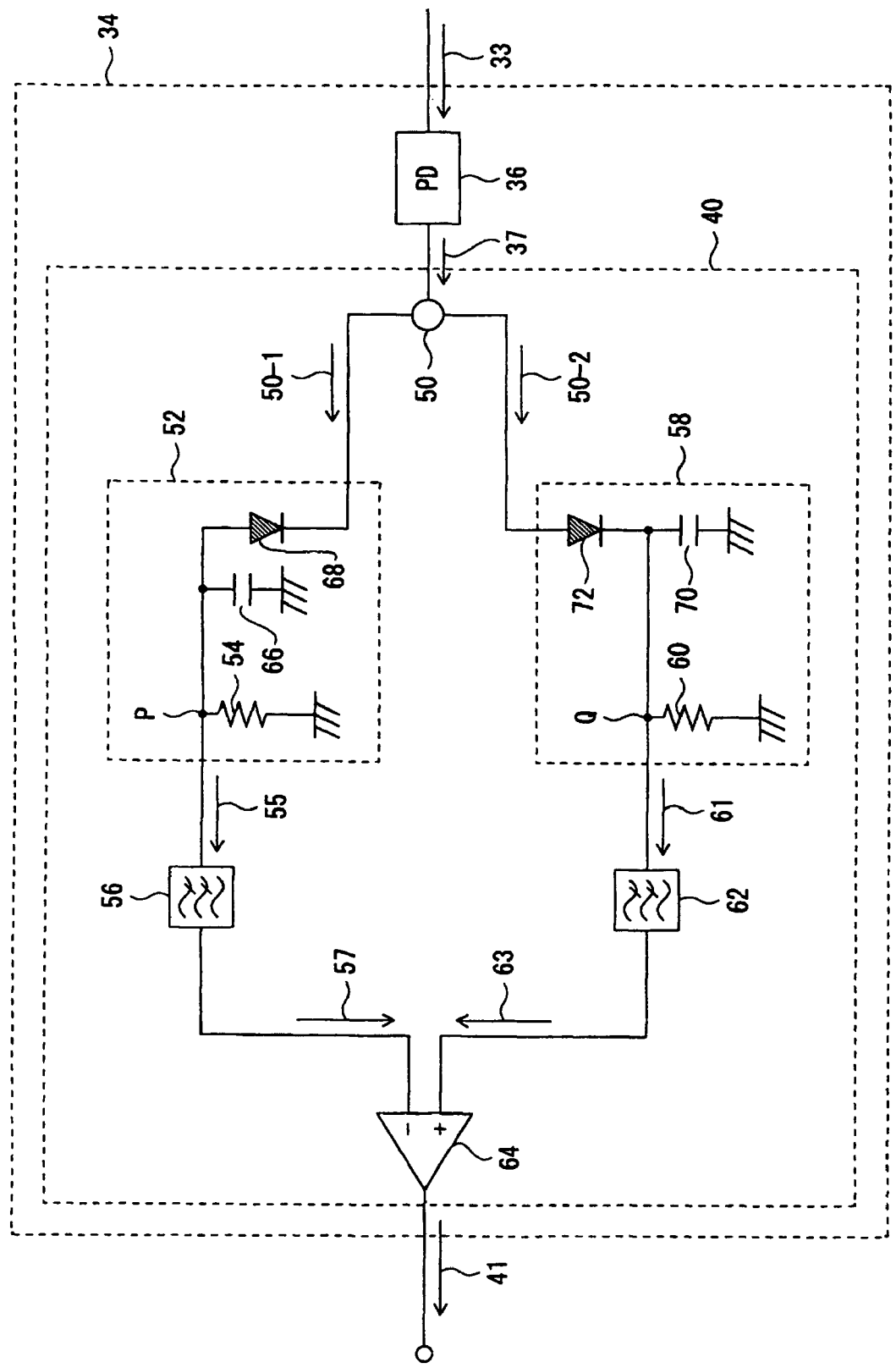
FIG. 5 is a schematic block structural diagram of a peak detection circuit.

Note that FIG. 3 through FIG. 5 illustrates a structural example relating to the present invention. Accordingly, the relationships of the arrangement and the like of the respective structural elements are merely illustrated schematically to the extent that the present invention can be understood. Accordingly, the present invention is not limited to the illustrated examples. Further, in the following description, there are cases in which specific conditions and the like are used. However, these conditions and the like are merely suitable examples, and accordingly, the present invention is not limited in any way thereto. In the block structural diagrams shown in FIG. 3 through FIG. 5, the paths of the optical signals, such as optical fibers and the like, are shown by the thick lines. Moreover, the paths of the electrical signals are shown by the thin lines. Identifying numbers and identifying numerals, that identify the signals that propagate through the optical paths, are applied to the arrows that run along the optical paths of the signals.

Structural elements that are similar in FIG. 3 through FIG. 5, as well as in above-described FIG. 1, are denoted by the same numbers, and repeat description thereof may be omitted.

First Exemplary Embodiment

The structure and operation of an OTDM-DPSK signal generating apparatus of an exemplary embodiment of the present invention will be described with reference to FIG. 3 through FIG. 8.

<Structure>

The basic structure of the OTDM-DPSK signal generating apparatus of the exemplary embodiment of the present invention will be described with reference to FIG. 3. FIG. 3 is a schematic block structural diagram of the OTDM-DPSK signal generating apparatus of the exemplary embodiment of the present invention.

The OTDM-DPSK signal generating apparatus of the exemplary embodiment of the present invention includes an OTDM-DPSK signal generating section 28 and an optical carrier phase difference detecting section 30.

The OTDM-DPSK signal generating section 28 includes the optical splitter 12, the first phase modulator 14, the second phase modulator 16, the ½-bit delay device 18, the optical coupler 20, and a monitor signal branching device 26.

The optical splitter 12 divides the optical pulse train 11 in two into the first optical pulse train 13-1 and second optical pulse train 13-2. From the inputted first optical pulse train 13-1, the first phase modulator 14 generates the differential phase shift keying signal of the first channel (hereinafter called "first DPSK signal") 15 that is coded in the DPSK format, and outputs the first DPSK signal 15. From the inputted second optical pulse train 13-2, the second phase modulator 16 generates the differential phase shift keying signal of the second channel (hereinafter called "second DPSK signal") 17 that is coded in the DPSK format, and outputs the second DPSK signal 17.

A binary digital signal of the first channel is amplified at the first modulator driver 22 until a level at which the first phase modulator 14 can operate. The amplified binary digital signal of the first channel is supplied to the first phase modulator 14 as the electrical signal 23 of the first channel. Similarly, a binary digital signal of a second channel is amplified at the second modulator driver 24 until a level at which the second phase modulator 16 can operate. The amplified binary digital signal of the second channel is supplied to the second phase modulator 16 as the electrical signal 25 of the second channel.

The first DPSK signal 15 is a signal that is generated by the first optical pulse train 13-1 being coded in the DPSK format by the first phase modulator 14, and is inputted to the optical coupler 20. On the other hand, the second DPSK signal 17 is a signal that is generated by the second optical pulse train 13-2 being coded in the DPSK format by the second phase modulator 16, and is inputted to the ½-bit delay device 18. The ½-bit delay device 18 provides, to the DPSK signal 17, a time delay (hereinafter called "½-bit time delay") corresponding to one-half of the time that one of the optical pulses, that structure the inputted second DPSK signal 17, occupies on the time axis, and generates and outputs it as the DPSK signal 19. The DPSK signal 19 is inputted to the optical coupler 20.

The optical coupler 20 OTD-multiplexes the first DPSK signal 15 and the DPSK signal 19, that was generated by being time delayed by ½ bit, by bit interleaving, and generates and outputs the OTDM-DPSK signal 21. The OTDM-DPSK signal 21 is inputted to the monitor signal branching device 26.

The monitor signal branching device 26 branches-off and takes-out a monitor signal 27-2 from the OTDM-DPSK signal 21. The monitor signal branching device 26 outputs an OTDM-DPSK signal 27-1 as the output signal of the OTDM-DPSK signal generating section 28. The monitor signal 27-2 is inputted to the optical carrier phase difference detecting section 30.

The optical carrier phase difference detecting section 30 has an optical carrier interferometer (IF) 32 and an interference signal detecting section 34. The optical carrier phase difference detecting section 30 generates and outputs an optical carrier phase difference detection signal 41 that is provided as a function of the optical carrier phase difference between adjacent optical pulses that structure the monitor signal 27-2.

The monitor signal 27-2, that is inputted to the optical carrier phase difference detecting section 30, is first inputted to the optical carrier interferometer 32 that structures the optical carrier phase difference detecting section 30.

The monitor signal 27-2 is inputted to the optical carrier interferometer 32, and an interference monitor signal 33 is generated and outputted from the optical carrier interferometer 32. This mechanism will be described with reference to FIG. 4. FIG. 4 is a schematic block structural diagram of the optical carrier interferometer 32.

The optical carrier interferometer 32 has an optical splitter 42 and an optical coupler 44. The optical splitter 42 splits the monitor signal 27-2 into a first divisional monitor signal 42-1 and a second divisional monitor signal 42-2, and outputs the signals. The optical carrier interferometer 32 inputs the first divisional monitor signal 42-1 and the second divisional monitor signal 42-2 to a first arm waveguide 46 and a second arm waveguide 48, respectively. The optical path of the first arm waveguide 46 is an optical path from the optical splitter 42 to the optical coupler 44. The optical path of the second arm waveguide 48 is also an optical path from the optical splitter 42 to the optical coupler 44. However, the optical path length of the second arm waveguide 48 is set to be longer than the optical path length of the first arm waveguide 46, by a length corresponding to one bit of the monitor signal 27-2.

Namely, the optical path lengths of the first arm waveguide 46 and the second arm waveguide 48 are set such that there is a time delay difference, that corresponds to the time that one optical pulse occupies on the time axis, between the first divisional monitor signal 42-1 and the second divisional monitor signal 42-2. Therefore, at the point in time when the second divisional monitor signal 42-2 arrives at the optical coupler 44, a time delay corresponding to one bit is provided thereto with respect to the first divisional monitor signal 42-1. As a result, the outputted second divisional monitor signal 42-2 is a delayed second divisional monitor signal.

At the optical coupler 44, the first divisional monitor signal 42-1 and the delayed second divisional monitor signal 42-2 are combined and interfere. Due thereto, the interference monitor signal 33 is generated, and is outputted from the optical carrier interferometer 32.

Here, the same reference number 42-2 is used for the second divisional monitor signal and the delayed second divisional monitor signal. This is because a phase delay corresponding to one bit arises at the phases with respect to the first divisional monitor signal at the point in time of arriving at the optical coupler 44, and the two cannot be distinguished while propagating through the second arm waveguide 48. Accordingly, when referring to the second divisional monitor signal at the point in time when it arrives at the optical coupler 44, it will be called the delayed second divisional monitor signal 42-2 in particular.

The interference signal detecting section 34 is structured to include a O/E converter (PD) 36 and a peak detection circuit (PCD) 40. The interference signal detecting section 34 generates and outputs the optical carrier phase difference detection signal 41 that is a voltage signal that is proportional to the time average intensity of the alternating current component of the interference monitor signal that is extracted from the inputted interference monitor signal 33.

The O/E converter 36 photoelectrically converts the interference monitor signal 33, and generates and outputs an electrical interference monitor signal 37. The peak detection circuit 40 generates and outputs the optical carrier phase difference detection signal 41 that is a voltage signal proportional to the time average intensity of the alternating current component of the electrical interference monitor signal 37.

The structure of the peak detection circuit 40 will be described with reference to FIG. 5. FIG. 5 is a schematic block structural diagram of the peak detection circuit 40.

The peak detection circuit 40 is structured to include an electrical branching device 50, a first high frequency detector 52, a first low-pass filter 56, a second high-frequency detector 58, a second low-pass filter 62 and a direct current differential amplifier 64.

The first high frequency detector 52 is structured to have a diode 68 that includes an electrical resistor 54 and a capacitor 66. The second high frequency detector 58 is structured to have a diode 72 that includes an electrical resistor 60 and a capacitor 70.

The electrical branching device 50 branches the electrical interference monitor signal 37 into a first electrical interference monitor signal 50-1 and a second electrical interference monitor signal 50-2, and outputs these signals. The first high frequency detector 52 generates a first high frequency detection signal 55 from the first electrical interference monitor signal 50-1, and outputs the generated signal. The first low-pass filter 56 generates a first low frequency signal 57 from the first high frequency detection signal 55, and outputs the generated signal. The second high frequency detector 58 generates a second high frequency detection signal 61 from the second electrical interference monitor signal 50-2, and outputs the generated signal. The second low-pass filter 62 generates a second low frequency signal 63 from the second high frequency detection signal 61, and outputs the generated signal. The direct current differential amplifier 64 generates the optical carrier phase difference detection signal 41 from the first low frequency signal 57 and the second low frequency signal 63, and outputs the generated signal.

<Operation>

In explaining the operation of the OTDM-DPSK signal generating apparatus of the exemplary embodiment of the present invention, the bit rates of the first DPSK signal 15 and the second DPSK signal 17 are 40 Gbit/s. Accordingly, the bit rate of the OTDM-DPSK signal 21, that is generated by OTD-multiplexing the first DPSK signal 15 and the second DPSK signal 17, is 80 Gbit/s. The generality of the following explanation is preserved even though description is given by assuming a specific bit rate of the DPSK signals of the first and second channels in this way.

The optical pulse train 11 whose frequency is 40 GHz is inputted to the OTDM-DPSK signal generating section 28 (see FIG. 3). The optical pulse train 11 is divided in two at the optical splitter 12, and is generated as the first optical pulse train 13-1 and the second optical pulse train 13-2. The first optical pulse train 13-1 and the second optical pulse train 13-2 are inputted to the first phase modulator 14 and the second phase modulator 16, respectively.

At the first phase modulator 14 and the second phase modulator 16, the first optical pulse train 13-1 and the second optical pulse train 13-2 are coded in the DPSK format by the transmission signals that are supplied from the first modulator driver 22 and the second modulator driver 24. Then, the coded first optical pulse train 13-1 and second optical pulse train 13-2 are generated and outputted as the first DPSK signal 15 and the second DPSK signal 17.

The second DPSK signal 17 is inputted to the ½-bit delay device 18, and a time delay of $1.25 \times 10^{-7}$ seconds ($=1/(2 \times 40 \times 10^9)$) corresponding to ½ bit is provided thereto, and the delayed second DPSK signal 19 is generated and outputted. The first DPSK signal 15 and the delayed second DPSK signal 19 are multiplexed at the optical coupler 20, and generated and outputted as the OTDM-DPSK signal 21. Namely, at the OTDM-DPSK signal generating section 28, the optical pulse train 11 is used as the basis, and the transmission signals of the two channels that are supplied from the first modulator driver 22 and the second modulator driver 24 are converted into DPSK signals. Further, these DPSK signals of the two channels are OTD-multiplexed such that the OTDM-DPSK signal 21 is generated.

Generating and outputting the OTDM-DPSK signal 21 is the intrinsic function of the OTDM-DPSK signal generating section 28. However, in order to detect the optical carrier phase difference between the adjacent optical pulses that structure the OTDM-DPSK signal 21, the OTDM-DPSK signal generating section 28 is provided with the monitor signal branching device 26 for branching-off the monitor signal 27-2 from the OTDM-DPSK signal 21. The monitor signal 27-2, that is branched-off and taken-out by the monitor signal branching device 26, is inputted to the optical carrier phase difference detecting section 30.

The OTDM-DPSK signal generating apparatus of the exemplary embodiment of the present invention does not have means for carrying out multiplexing with the relationship of the phases of the two signals being prescribed in a constant relationship, at the time when the first DPSK signal 15 and the delayed second DPSK signal 19 are multiplexed and generated at the optical coupler 20. Therefore, the phase difference between adjacent the optical pulses that structure the OTDM-DPSK signal 21 is distributed randomly in the relationships of any of 0, $\phi$, $\pi$, and $\phi+\pi$.

A DPSK signal that is coded in the DPSK format is structured as a binary digital signal by making the phase difference between the adjacent optical pulses that structure the DPSK signal be either 0 or $\pi$. Accordingly, the phase difference between the adjacent optical pulses that structure the OTDM-DPSK signal 21 is ideally distributed in a relationship that is either 0 or $\pi$. Namely, the relationship of the phase difference between the adjacent optical pulses that structure the OTDM-DPSK signal 21 ideally is stipulated so as to always be $\phi=0$.

Thus, first, in order to generate the OTDM-DPSK signal 21 that is prescribed such that $\phi=0$ always, the value of $\phi$ must be known. The means for measuring the value of $\phi$ is the optical carrier phase difference detecting section 30. The optical carrier phase difference detection signal 41, that is provided as a function of the optical carrier phase difference between the adjacent optical pulses that structure the OTDM-DPSK signal 21, is generated and outputted from the optical carrier phase difference detecting section 30.

Next, description will be given of the operations at the optical carrier phase difference detecting section 30 from the inputting of the monitor signal 27-2 to the generation of the optical carrier phase difference detection signal 41, with reference to FIG. 6A and FIG. 6B that show time waveforms of the optical signals at respective places of the optical carrier phase difference detecting section 30.

Figure 6A:
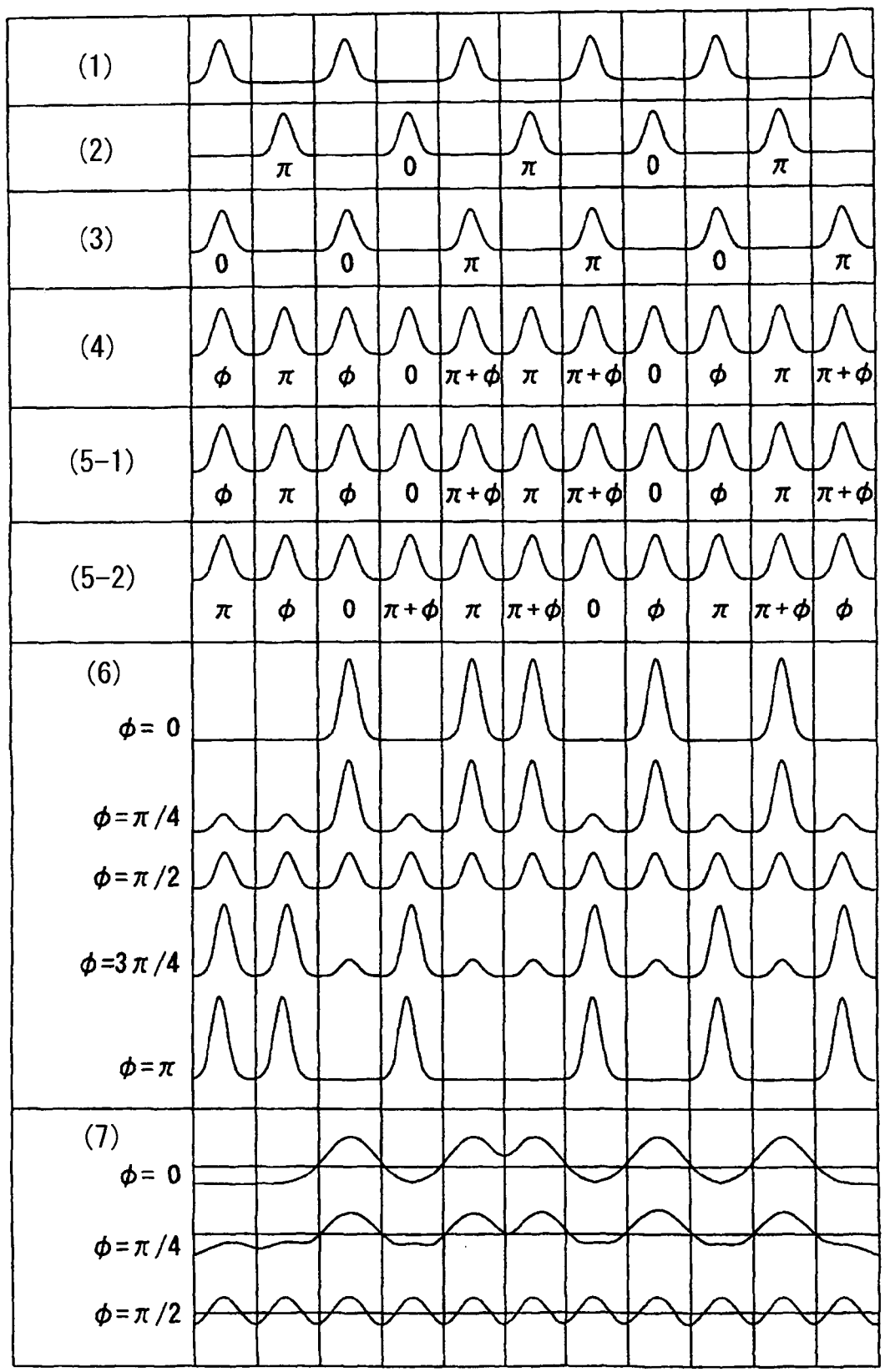
FIG. 6A and FIG. 6B are drawings showing time waveforms of optical signals at respective places within the OTDM-DPSK signal generating apparatus of the exemplary embodiment of the present invention.

(1) through (7) of FIG. 6A shows the time waveforms of the optical signals at respective places within the OTDM-DPSK signal generating apparatus of the exemplary embodiment of the present invention. (1) of FIG. 6A shows the time waveform of the optical pulse train 11, (2) shows the time waveform of the first DPSK signal 15, (3) shows the time waveform of the delayed second DPSK signal 19, (4) shows the time waveform of the OTDM-DPSK signal 21, (5-1) shows the time waveform of the first divisional monitor signal 42-1, (5-2) shows the time waveform of the second divisional monitor signal 42-2, (6) shows the time waveforms of the interference monitor signal 33 at times when $\phi=0$, $\pi/4$, $\pi/2$, $3\pi/4$, and $\pi$ respectively, and (7) shows the time waveforms of the electrical interference monitor signal 37 at times when $\phi=0$, $\pi/4$, and $\pi/2$ respectively.

Figure 6B:
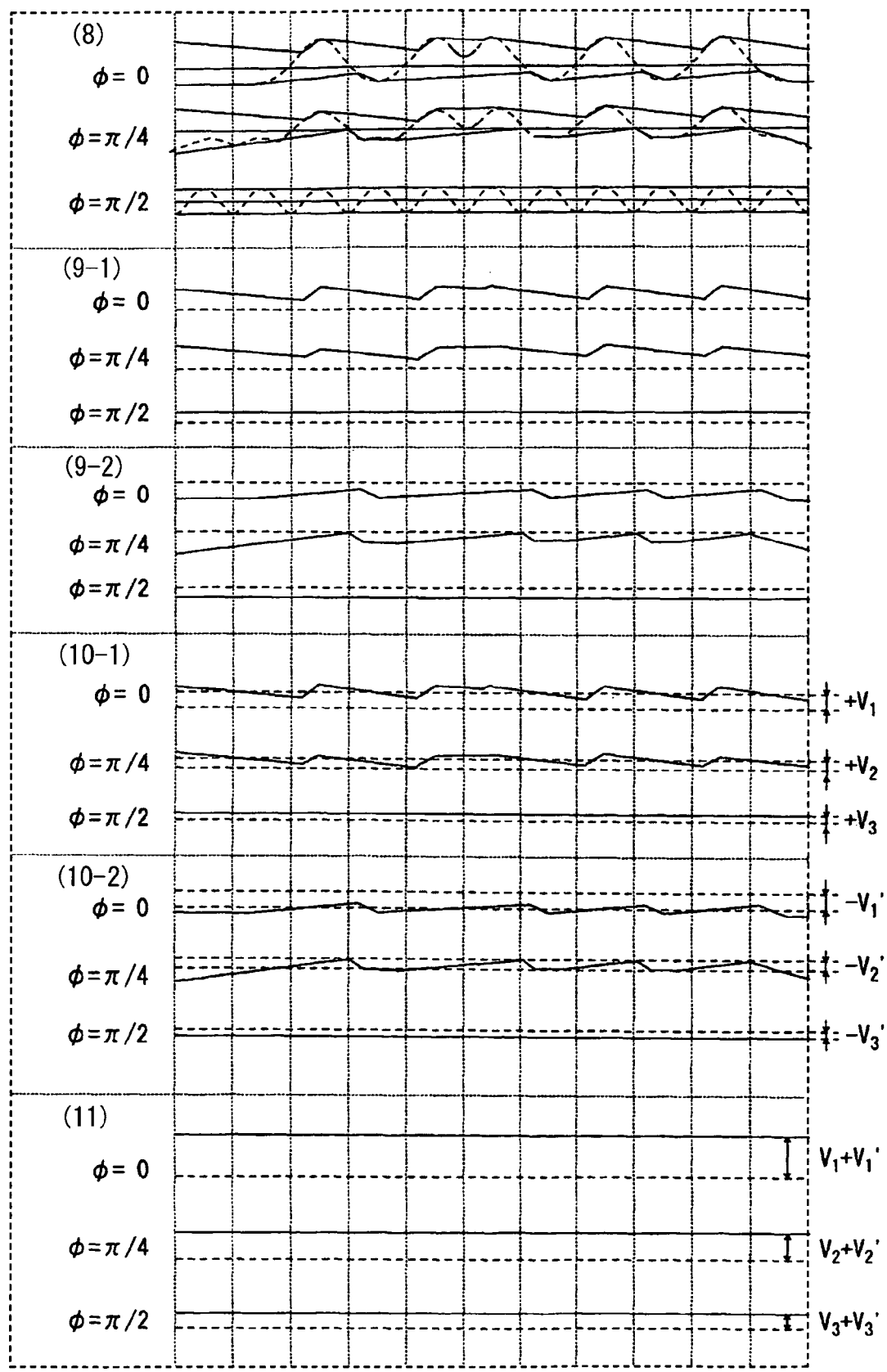

(8) through (11) of FIG. 6B shows the time waveforms of signals at the peak detection circuit 40 within the OTDM-DPSK signal generating apparatus of the exemplary embodiment of the present invention. (8) of FIG. 6B shows time waveforms of the first high frequency detection signal 55 at times when $\phi=0$, $\pi/4$ and $\pi/2$, (9-1) shows time waveforms of the first high frequency detection signal 55 at times when $\phi=0$, $\pi/4$ and $\pi/2$ respectively, (9-2) shows time waveforms of the second high-frequency detection signal 61 at times when $\phi=0$, $\pi/4$ and $\pi/2$ respectively, (10-1) shows time waveforms of the first low frequency signal 57 at times when $\phi=0$, $\pi/4$ and $\pi/2$ respectively, (10-2) shows time waveforms of the second low frequency signal 63 at times when $\phi=0$, $\pi/4$ and $\pi/2$ respectively, and (11) shows time waveforms of the optical carrier phase difference detection signal 41 at times when $\phi=0$, $\pi/4$ and $\pi/2$ respectively.

In FIG. 6A and FIG. 6B, the horizontal axis is the time axis, and is marked at an arbitrary scale. The vertical axis shows signal intensity marked at an arbitrary scale. For ease of viewing, the time waveforms shown in FIG. 6A and FIG. 6B are shown schematically while maintaining the characteristics that the signals have, within the range needed for explaining the principles of operation of the OTDM-DPSK signal generating apparatus of the exemplary embodiment of the present invention. Accordingly, these time waveforms are different than actual time waveforms.

The time waveform of the optical pulse train 11 is as shown in (1) of FIG. 6A, and is an optical pulse train whose repetition frequency on the time axis of the optical pulses is 40 GHz. The optical carrier envelope phases of the respective optical pulses, i.e., the optical carrier phases, are all aligned. In the DPSK signal, the differences between the optical carrier phases and the optical carrier phases of the adjacent optical pulses become a problem, but the absolute values thereof are not a problem. Because all of the optical carrier phases of the optical pulses that structure the optical pulse train 11 are aligned, the phase values of the optical carrier phases are not shown in (1) of FIG. 6A.

The first differential phase shift keying signal 15 shown in (2) of FIG. 6A and the second differential phase shift keying signal 17 shown in (3) are binary digital differential phase shift keying signals provided by ($\pi$, 0, $\pi$, 0, $\pi$, ...) and (0, 0, $\pi$, $\pi$, 0, $\pi$, ...), respectively. This reflects the fact that the electrical signal 23 of the first channel and the electrical signal 25 of the second channel are binary digital signals provided by (1, 0, 1, 0, 1, ...) and (0, 0, 1, 1, 0, 0, ...), respectively.

The time waveform of the OTDM-DPSK signal 21 shown in (4) of FIG. 6A is the time waveform of the signal generated by the optical carrier phases of the optical pulses respectively structuring the first differential phase shift keying signal 15 and the delayed second differential phase shift keying signal 19 interfering at phase differences of 0 and $\phi$, $\phi$ and $\pi$, 0 and ($\pi$+$\phi$), and $\pi$ and ($\pi$+$\phi$). In an ideal state, the OTDM-DPSK signal 21 is generated in a state in which the value of the magnitude $\pi$ of the phase fluctuation is 0. However, as shown in (4) of FIG. 6A, the optical carrier phases of the optical pulses structuring the OTDM-DPSK signal 21 are accompanied by a random phase fluctuation $\phi$. Namely, (4) of FIG. 6A shows that, at the optical paths through which optical signals of the OTDM-DPSK signal generating apparatus propagate, the state that $\phi$=0 cannot always be maintained unless control for suppressing fluctuations in the optical path lengths is carried out.

Further, the bit rate of the OTDM-DPSK signal 21 is 80 Gbit/s because the OTDM-DPSK signal 21 is a signal generated by 40 Gbit/s signals being time division multiplexed.

The first divisional monitor signal 42-1 and the second divisional monitor signal 42-2, that are shown in (5-1) and (5-2) of FIG. 6A respectively, have a phase offset of one bit (here, 12.5 picoseconds) with respect to one another, as mentioned previously.

(6) of FIG. 6A shows the time waveforms of the interference monitor signal 33 at times when $\phi$=0, $\pi$/4, $\pi$/2, 3$\pi$/4, and $\pi$ respectively.

As shown as the case $\phi$=0 in (6) of FIG. 6A, in cases in which the optical pulses of the first divisional monitor signal 42-1 and the second divisional monitor signal 42-2 overlap one another at the same phases, the intensity of the optical pulse becomes 4 times greater. Further, in the case in which $\phi$=$\pi$/2, equivalent optical pulses are generated at all of the time slots. In cases in which the value of $\phi$ is a magnitude between 0 and $\pi$/2, or is a magnitude between $\pi$/2 and $\pi$, two types of optical pulses that are optical pulses of a high intensity and optical pulses appear on the time axis in a one-to-one ratio. Therefore, if the peak intensity of the interference monitor signal 33 can be known, the value of the magnitude $\phi$ of the phase fluctuation can be known.

The method for learning the peak intensity of the interference monitor signal 33 will be described hereinafter.

When the interference monitor signal 33 is inputted to the O/E converter 36, it is converted into an electrical signal. The time waveform of the signal is so-called band-limited by the inherent time response speed of the O/E converter 36. Therefore, the full width half maximum (FWHM) of the time waveform of the optical pulses that are outputted is wider than the full width half maximum of the time waveform of the optical pulses that are inputted. For example, the XPRV22021 manufactured by U2T can be suitably used as the O/E converter 36.

The time waveforms of the electrical interference monitor signal 37 that is outputted from the O/E converter 36 are shown in (7) of FIG. 6A. (7) shows the time waveforms of the electrical interference monitor signal 37 at times when $\phi$=0, $\pi$/4, and $\pi$/2 respectively. The reason why times when $\phi$=3$\pi$/4 and $\pi$ are omitted from (7) is that they are the same as times of $\pi$/4 and 0, respectively.

By comparing the drawings of the time waveforms shown in (6) and (7) of FIG. 6A, it can clearly be understood that the full width half maximum of the time waveforms of the optical pulses of the electrical interference monitor signal 37 is wider than the full width half maximum of the time waveforms of the optical pulses of the interference monitor signal 33.

The averages of the absolute values of the positive and negative signal components centered around potential 0 of the electrical interference monitor signal 37 are equal. Further, the ratio of the respective absolute values of the maximum value and the minimum value of the electrical interference monitor signal 37 depends on the duty ratio of the optical pulses of the electrical interference monitor signal 37. Therefore, the peak detection circuit 40 is provided with the first high frequency detector 52 and the second high frequency detector 58 such that the respective absolute values of the maximum value and the minimum value of the electrical interference monitor signal 37 can be detected.

The duty ratio of the optical pulses means the ratio of the full width half maximum of the time waveform of the optical pulses with respect to the width of the time slot that one optical pulse occupies.

(8) of FIG. 6B shows time waveforms of the first high frequency detection signal 55 that is generated by the first high frequency detector 52. (8) shows the first high frequency detection signal 55 in cases in which $\phi$=0, $\pi$/4 and $\pi$/2, respectively. The first high frequency detector 52 is structured to include the diode 68 and the capacitor 66. The first high frequency detector 52 outputs the change in the potential of point P, that is the voltage value applied to the electrical resistor 54, as the first high frequency detection signal 55.

In (8) of FIG. 6B, the time waveforms of the first electrical interference monitor signal 50-1 are shown by the broken lines. Further, in (8), the time waveforms of the first high frequency detection signal 55 and the second high frequency detection signal 61 are shown by the solid lines. As can be understood from (8), the peak value of the time waveform of the first electrical interference monitor signal 50-1 is held at the time waveform of the first high frequency detection signal 55.

On the other hand, the second high frequency detector 58 is structured to include the diode 72 and the capacitor 70. The second high frequency detector 58 outputs the change in the potential of point Q, that is the voltage value applied to the electrical resistor 60, as the second high frequency detection signal 61. The first high frequency detection signal 55 and the second high frequency detection signal 61 are signals whose absolute values are equal and whose signs are opposite.

The time waveforms of the first high frequency detection signal 55 and the second high frequency detection signal 61, that are shown by the solid lines in (8) of FIG. 6B for convenience of explanation, are again illustrated in (9-1) and (9-2), respectively, of FIG. 6B. In (9-1) and (9-2) of FIG. 6B, the potential shown by the broken line shows 0 level (ground potential). The signal levels of the first high frequency detection signals 55 shown in (9-1) are positive values. In contrast, it can be seen that the signal levels of the second high frequency detection signals 61 shown in (9-2) are negative values.

The one-dot chain lines shown in (10-1) and (10-2) of FIG. 6B show time waveforms of the first low frequency signal 57 and the second low frequency signal 63, respectively. The first low frequency signal 57 and the second low frequency signal 63 are signals that are generated by the first high frequency detection signal 55 and the second high frequency detection signal 61, that are shown by the solid lines, passing through the first low-pass filter 56 and the second low-pass filter 62 and being time-averaged.

When $\phi=0$, the direct current level of the first low frequency signal 57 is $+V_1$, and the direct current level of the second low frequency signal 63 is $-V_1'$. When $\phi=\pi/4$, the direct current level of the first low frequency signal 57 is $+V_2$, and the direct current level of the second low frequency signal 63 is $-V_2'$. When $\phi=\pi/2$, the direct current level of the first low frequency signal 57 is $+V_3$, and the direct current level of the second low frequency signal 63 is $-V_3'$.

As the value of the magnitude $\phi$ of the phase fluctuation increases from 0 to $\pi/2$, the values of the absolute values of the first low frequency signal 57 and the second low frequency signal 63 decrease. Namely, if the values of the absolute values of the first low frequency signal 57 and the second low frequency signal 63 can be known, the value of the magnitude $\phi$ of the phase fluctuation can be known.

The first low frequency signal 57 and the second low frequency signal 63 are inputted to the direct current differential amplifier 64, and the optical carrier phase difference detection signal 41 is generated and outputted. The time waveform of the optical carrier phase difference detection signal 41 is shown in (11) of FIG. 6B. When the second low frequency signal 63 is inputted to the direct current differential amplifier 64, the polarity thereof is reversed (negative potential is converted into positive potential), and the signal is added to the first low frequency signal 57. The added value is amplified and outputted. The output from the direct current differential amplifier 64 is the optical carrier phase difference detection signal 41.

Accordingly, in a case in which the potential of the first low frequency signal 57 is V and the potential of the second low frequency signal 63 is $-V'$, the potential of the second low frequency signal 63 is inverted and becomes V', and the potential V of the first low frequency signal 57 is added to this value, and the sum becomes V+V'. At the direct current differential amplifier 64, the 2V obtained by addition is amplified and outputted. The amplification factor of the direct current differential amplifier 64 differs in accordance with the situation in which the optical carrier phase difference detection signal 41 is used. Accordingly, here, the amplification factor of the direct current differential amplifier 64 is 1. Namely, the signal is not amplified nor damped by the amplification factor of the direct current differential amplifier 64. Therefore, the added value obtained by addition with the first low frequency signal 57 is itself outputted as the optical carrier phase difference detection signal 41 from the direct current differential amplifier 64.

As shown in (11) of FIG. 6B, when $\phi=0$, the direct current level of the optical carrier phase difference detection signal 41 is $V_1+V_1'$. When $\phi=\pi/4$, the direct current level of the optical carrier phase difference detection signal 41 is $V_2+V_2'$. When $\phi=\pi/2$, the direct current level of the optical carrier phase difference detection signal 41 is $V_3+V_3'$. The optical carrier phase difference detection signal 41 is a direct current signal without a ripple component. Therefore, the direct current level of the optical carrier phase difference detection signal 41 is an ideal parameter when utilized as a control signal in cases in which the magnitude $\phi$ of the phase fluctuation is controlled by using a positive feedback circuit or the like.

For example, the 70KC50 manufactured by Anritsu, or the like, is appropriately used as the direct current differential amplifier 64.

Figure 8:
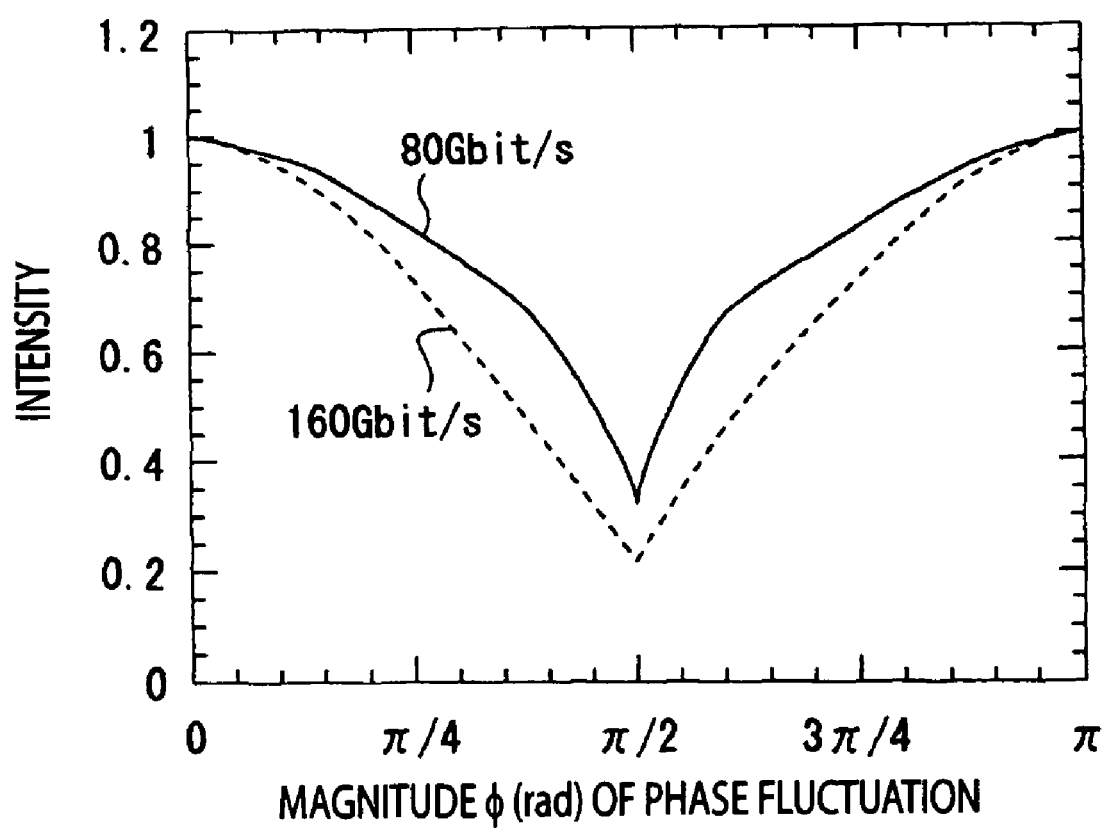
FIG. 8 is a drawing showing the relationship between the value of the magnitude φ of the phase fluctuation and the intensity of an optical carrier phase difference detection signal.

The relationship between the magnitude $\phi$ of the phase fluctuation and the magnitude of the direct current level of the optical carrier phase difference detection signal 41 will be described with reference to FIG. 8. FIG. 8 shows the relationship between the value of the magnitude $\phi$ of the phase fluctuation and the intensity of the optical carrier phase difference detection signal. The magnitude $\phi$ of the phase fluctuation is shown on the horizontal axis in units of radians. The intensity (direct current level) of the optical carrier phase difference detection signal 41 is shown on the vertical axis on an arbitrary scale.

The curve shown by the solid line shows the magnitude of the direct current level of the optical carrier phase difference detection signal 41 in a case in which the bit rates of the first differential phase shift keying signal 15 and the second differential phase shift keying signal 17 are 40 Gbit/s. In this case, the bit rate of the OTDM-DPSK signal 21 generated by the first differential phase shift keying signal 15 and the second differential phase shift keying signal 17 being OTD-multiplexed is 80 Gbit/s. The curve shown by the solid line in FIG. 8 shows the magnitude $\phi$ of the phase fluctuation of the optical pulses of the OTDM-DPSK signal 21 whose bit rate is 80 Gbit/s.

The broken line in FIG. 8 shows the intensity of the direct current level of an optical carrier phase difference detection signal in a case in which the bit rate of the OTDM-DPSK signal is 160 Gbit/s.

In both cases, the magnitude of the direct current level of the optical carrier phase difference detection signal decreases monotonically as $\phi$ increases from $\phi=0$ to $\pi/2$. Further, the magnitude of the direct current level of the optical carrier phase difference detection signal in a case in which $\phi$ increases from $\phi=\pi/2$ to $\pi$, corresponds to the magnitude of the direct current level of the optical carrier phase difference detection signal in a case in which $\phi$ decreases from $\phi=\pi/2$ to 0. Namely, $\phi=0$ and $\phi=\pi$ show substantially the same state. As shown in FIG. 8, in order to maintain the value of $\phi$ small (i.e., in order to maintain the value of $\phi$ at a value near $\phi=0$ or $\phi=\pi$), it suffices for the intensity of the direct current level of the optical carrier phase difference detection signal to be controlled so as to be large.

As described above, in the OTDM-DPSK signal generating apparatus of the present invention, the value of $\phi$ can be maintained small if the intensity of the direct current level of the optical carrier phase difference detection signal is controlled so as to be large. Accordingly, for example, a bias voltage component is added to the transmission signals 23 and 25 that are supplied from the first modulator driver 22 and the second modulator driver 24. Then, positive feedback of the magnitude of the bias voltage component, so that the intensity of the direct current level of the optical carrier phase difference detection signal becomes large, is possible. In this way, an OTDM-DPSK signal generating apparatus, that can autonomously realize always maintaining the value of $\phi$ at a minimum, can be realized.

Structuring a positive feedback means, in which the intensity of the direct current level of the optical carrier phase difference detection signal uses the magnitude as a parameter, can be realized by employing a known algorithm of the local search method, the steepest slope method, the maximum control method, or the like.

Here, as an example the time waveforms of actual signals shown in FIG. 6A and FIG. 6B, the actual time waveforms of the interference monitor signal 33 will be described with reference to FIG. 7A and FIG. 7B. As described above, the time waveforms of the signals shown in FIG. 6A and FIG. 6B, and not just those of the interference monitor signal 33, are different than actual time waveforms. However, in the above explanation of the principles of operation of the present invention, there is no need to know the details of strictly actual time waveforms of the respective signals.

Figure 7A:
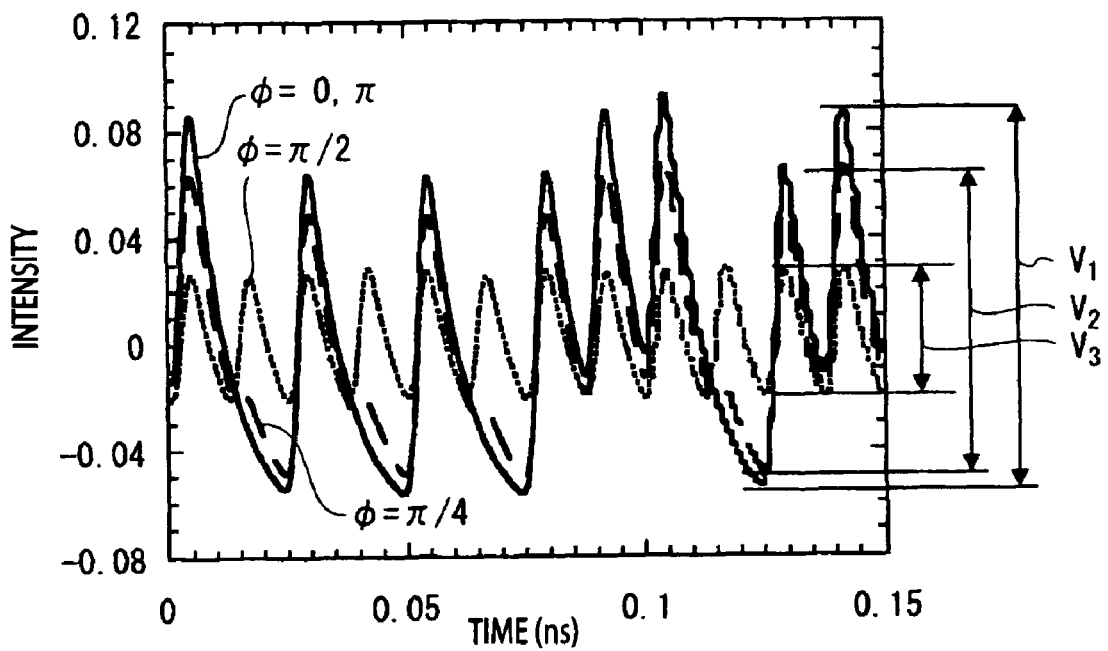
FIG. 7A and FIG. 7B are drawings showing time waveforms in cases in which the value of a magnitude φ of the phase fluctuation of an interference monitor signal outputted from the optical carrier interferometer is 0, π/4, π/2, and π.
Figure 7B:
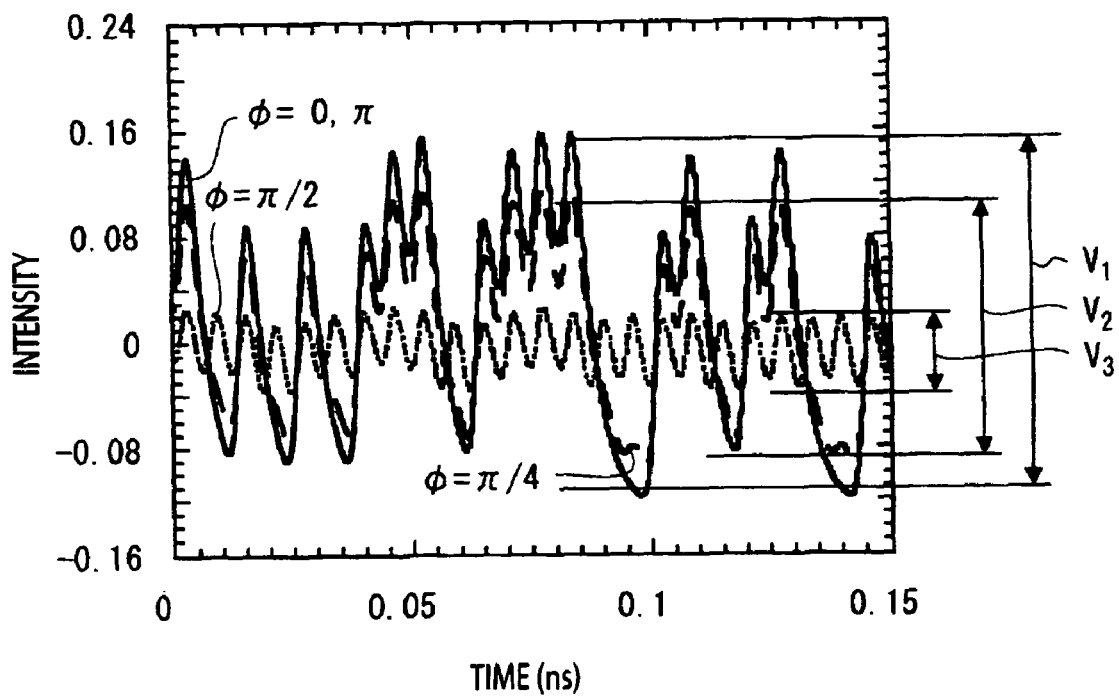

FIG. 7A and FIG. 7B shows actual time waveforms of the interference monitor signal 33 that is outputted from the optical carrier interferometer 32 in cases in which the value of the magnitude φ of the phase fluctuation is 0, π/4, π/2, and π. FIG. 7A shows the time waveforms of the interference monitor signal 33 in a case in which the bit rate of the monitor signal is 80 Gbit/s. FIG. 7B shows the time waveforms of the interference monitor signal 33 in a case in which the bit rate of the monitor signal is 160 Gbit/s.

In FIG. 7A and FIG. 7B, time is shown on the horizontal axis in units of ns. Further, the intensity of the interference monitor signal 33 is shown on the vertical axis on an arbitrary scale. As shown in FIG. 7A, in a case in which the bit rate is 80 Gbit/s, the time waveform of the interference monitor signal 33 when φ=0 or π is shown by the solid line. The difference between the maximum value and the minimum value of the time waveform of the interference monitor signal 33 at this time is $V_1$. The time waveform of the interference monitor signal 33 when φ=π/4 is shown by the broken line with the large intervals. The difference between the maximum value and the minimum value of the time waveform of the interference monitor signal 33 at this time is $V_2$. The time waveform of the interference monitor signal 33 when φ=π/2 is shown by the broken line with the small intervals. The difference between the maximum value and the minimum value of the time waveform of the interference monitor signal 33 at this time is $V_3$. As can be understood from FIG. 7A, the nearer that the value of the magnitude φ of the phase fluctuation is to φ=π/2, the greater the difference between the maximum value and the minimum value. Further, the nearer that φ is to 0 or π, the smaller the difference between the maximum value and the minimum value.

On the other hand, in FIG. 7B, in a case in which the bit rate is 160 Gbit/s, the time waveform of the interference monitor signal 33 when φ=0 or π is shown by the solid line. The difference between the maximum value and the minimum value of the time waveform of the interference monitor signal 33 at this time is $V_1$. The time waveform of the interference monitor signal 33 when φ=π/4 is shown by the broken line with the large intervals. The difference between the maximum value and the minimum value of the time waveform of the interference monitor signal 33 at this time is $V_2$. The time waveform of the interference monitor signal 33 when φ=π/2 is shown by the broken line with the small intervals. The difference between the maximum value and the minimum value of the time waveform of the interference monitor signal 33 at this time is $V_3$. As can be understood from FIG. 7B, the nearer that the value of the magnitude φ of the phase fluctuation is to φ=π/2, the greater the difference between the maximum value and the minimum value. Further, the nearer that φ is to 0 or π, the smaller the difference between the maximum value and the minimum value.

Comparing the interference monitor signals shown in FIG. 7A and the interference monitor signals shown in FIG. 7B, the bit rate of the interference monitor signals shown in FIG. 7B is twice as large, and therefore, the period thereof is ½.

Second Exemplary Embodiment

<$2^N$ Channel Multiplex OTDM-DPSK Signal Generating Apparatus>

Next, a $2^N$ channel multiplex OTDM-DPSK signal generating apparatus (where N is an integer of greater than or equal to 2) will be constructed by using the 2:1 multiplex OTDM-DPSK signal generating apparatus of the present invention. In this case, the OTDM-DPSK signal generating section and the optical carrier phase difference detecting section are structured as follows.

The OTDM-DPSK signal generating section is equipped with an optical splitter, first through $2^N$th phase modulators, ($2^N$–1) optical couplers, and ($2^{N-k}$) kth-order monitor signal branching devices (where k is all integers from 1 to N). The optical splitter divides the optical pulse train in $2^N$ into 1 through $2^N$ optical pulse trains. The first through $2^N$th phase modulators code, in the DPSK format, the inputted first through $2^N$th optical pulse trains. Next, the first through $2^N$th phase modulators generate and output DPSK signals of the first through $2^N$th channels, respectively. The ($2^N$–1) optical couplers OTD-multiplex the DPSK signals of the first through $2^N$th channels, and generate and output $2^N$:1 multiplex OTDM-DPSK signals. The ($2^{N-1}$) first-order monitor signal branching devices branch-off and take-out the first-order monitor signals respectively from the ($2^{N-1}$) first-order OTDM-DPSK signals that are generated by OTD-multiplexing the DPSK signals of the adjacent ith channel and (i+1)st channel (where i is all integers from 1 to $2^N$–1). Successively, the ($2^{N-k}$) kth-order monitor signal branching devices (where k is all integers from 2 to N) respectively branch-off and take-out the kth-order monitor signals from the ($2^{N-k}$) kth-order optical-time-division-multiplexing differential phase shift keying signals.

The first-order through kth-order monitor signals are inputted to the optical carrier phase difference detecting section. ($2^N$–1) optical carrier phase difference detection signals, that are provided as functions of the optical carrier phase differences between the adjacent optical pulses that respectively structure these first-order through kth-order monitor signals, are generated and outputted.

The reason why the total number of optical carrier phase difference detection signals is ($2^N$–1) will be described here. As described above, the respective optical carrier phase difference detection signals are provided respectively as functions of the optical carrier phase differences between the adjacent optical pulses that respectively structure these first-order through kth-order monitor signals. Accordingly, the total number of the optical carrier phase difference detection signals is equal to the total number of the first-order through kth-order monitor signals. The number of the first-order monitor signals is ($2^{N-1}$), the number of the second-order monitor signals is ($2^{N-2}$), and, generally, the number of the kth-order monitor signals is ($2^{N-k}$). Accordingly, the total number of the first-order through kth-order monitor signals is $2^{N-1}+2^{N-2}\ldots+2^0=2^N-1$ (signals).

As described above, the respective first-order through kth-order monitor signals merely have different bit rates, and it can be understood that, basically, the structure of the 2:1 multiplex OTDM-DPSK signal generating apparatus of the present invention is used. Namely, the bit rate of the kth-order monitor signals is $2^k$ times the bit rate of the first-order monitor signals. Looking at the respective first-order through kth-order monitor signals separately, the kth-order monitor signal is a signal that has been branched-off from an OTDM-DPSK signal whose bit rate is $2^k$ times the first-order monitor signal. Namely, the kth-order monitor signal can be viewed as a signal that is generated by the OTDM-DPSK signal generating apparatus 2:1 multiplexing an OTDM-DPSK signal of a bit rate that is $2^{k-1}$ times the first-order monitor signal that is branched-off from the (k−1)st-order monitor signal.

To facilitate understanding, explanation will be given of a case in which N=2, i.e., there are four channels ($2^2$ channels). In this case, the OTDM-DPSK signal generating section is equipped with an optical splitter, first through fourth phase modulators, three optical couplers, two first-order monitor signal branching devices, and one second-order monitor signal branching device.

The optical splitter divides the optical pulse train in four into first through fourth optical pulse trains. The first through fourth optical pulse trains are respectively inputted to the first through fourth phase modulators. The first through fourth phase modulators respectively generate and output DPSK signals of the first through fourth channels that are coded in the DPSK format.

The three optical couplers OTD-multiplex the DPSK signals of the first through fourth channels, and generate and output 4:1 multiplex OTDM-DPSK signals. The two first-order monitor signal branching devices respectively branch-off and take-out the first-order monitor signals from the two first-order OTDM-DPSK signals that are generated by OTD-multiplexing the respective 2:1 multiplex DPSK signals that are of the adjacent first channel and second channel, and second channel and third channel, and third channel and fourth channel. Successively, the first-order monitor signals are taken-out from the two first-order monitor signal branching devices, and second-order monitor signals are respectively branched-off and taken-out from the one second-order monitor signal branching device.

The optical carrier phase difference detecting section generates and outputs three optical carrier phase difference detection signals that are respectively provided as functions of the optical carrier phase differences between the adjacent optical pulses that respectively structure the inputted first-order and second-order monitor signals.

Even in a four-channel-multiplex OTDM-DPSK signal generating apparatus, the value of ϕ is maintained small. Namely, in order to maintain the value of ϕ at a value near ϕ=0 or ϕ=π, it suffices for the intensities of the direct current levels of the optical carrier phase difference detection signals to be controlled so as to become large at all of the optical carrier phase difference detection signals, with respect to the one second-order monitor signal and the two first-order monitor signals. Generally, in order to maintain the value of ϕ small, it suffices to control the intensities of the direct current levels of all of the optical carrier phase difference detection signals with respect to the $2^N-1$ first-order through kth-order monitor signals, to become large.

What is claimed is:

1. An optical-time-division-multiplexing differential phase shift keying signal generating apparatus comprising:
   an optical-time-division-multiplexing differential phase shift keying signal generating section including:
      an optical splitter dividing an optical pulse train in two into a first optical pulse train and a second optical pulse train;
      a first phase modulator generating, from the first optical pulse train that is inputted thereto, a differential phase shift keying signal of a first channel that is coded by a differential phase shift keying system, and outputting the differential phase shift keying signal of the first channel;
      a second phase modulator generating, from the second optical pulse train that is inputted thereto;
      a differential phase shift keying signal of a second channel that is coded by the differential phase shift keying system, and outputting the differential phase shift keying signal of the second channel;
      an optical coupler that optical-time-division-multiplexes the differential phase shift keying signal of the first channel and the differential phase shift keying signal of the second channel, and generates and outputs a 2:1 multiplex optical-time-division multiplexing differential phase shift keying signal; and
      a monitor signal branching device branching off and taking out a monitor signal from the 2:1 multiplex optical-time-division-multiplexing differential phase shift keying signal,
   an optical carrier phase difference detecting section, including:
      an optical carrier interferometer that divides the monitor signal that is inputted into first and second divisional monitor signals, and provides a time delay corresponding to one bit of the monitor signal to the second divisional monitor signal, and generates and outputs an interference monitor signal that is obtained by combining a generated delayed second divisional monitor signal and the first divisional monitor signal and causing them to interfere; and
      an interference signal detecting section extracting an alternating current component of the interference monitor signal from the interference monitor signal that is inputted, and generating and outputting an optical carrier phase difference detection signal that is a voltage signal proportional to a time average intensity of the alternating current component.

2. The optical-time-division-multiplexing differential phase shift keying signal generating apparatus of claim 1, wherein the interference signal detecting section includes:
   a optical-to-electrical converter that photoelectrically converts the interference monitor signal, and generates and outputs an electrical interference monitor signal; and
   a peak detection section generating and outputting an optical carrier phase difference detection signal that is a voltage signal proportional to a time average intensity of an alternating current component of the electrical interference monitor signal.

3. The optical-time-division-multiplexing differential phase shift keying signal generating apparatus of claim 2, wherein the peak detection section includes:
   an electrical branching device that branches the electrical interference monitor signal into a first electrical interference monitor signal and a second electrical interference monitor signal, and outputs the first electrical interference monitor signal and the second electrical interference monitor signal;
   a first high frequency detector generating a first high frequency detection signal from the first electrical interference monitor signal, and outputting the first high frequency detection signal;
   a first low-pass filter generating a first low frequency signal from the first high frequency detection signal, and outputting the first low frequency signal;

a second high frequency detector generating a second high frequency detection signal from the second electrical interference monitor signal, and outputting the second high frequency detection signal;

a second low-pass filter generating a second low frequency signal from the second high frequency detection signal, and outputting the second low frequency signal; and a direct current differential amplifier generating the optical carrier phase difference detection signal from both the first low frequency signal and the second low frequency signal, and outputting the optical carrier phase difference detection signal.

* * * * *